US012799033B2

(12) United States Patent
Sachsenhauser et al.

(10) Patent No.: US 12,799,033 B2
(45) Date of Patent: Nov. 17, 2026

(54) USE OF A COLLOIDAL POLYMER INORGANIC HYBRID MATERIAL AS A CONSTRUCTION COMPOSITION ADDITIVE

(71) Applicant: CONSTRUCTION RESEARCH & TECHNOLOGY GMBH, Trostberg (DE)

(72) Inventors: Bernhard Sachsenhauser, Trostberg (DE); Sebastien Dhers, Trostberg (DE); Francesca Moratti, Treviso (IT); Alessandro Dalla Libera, Treviso (IT)

(73) Assignee: Construction Research & Technology GmbH, Trostberg (DE)

( * ) Notice: Subject to any disclaimer, the term of this patent is extended or adjusted under 35 U.S.C. 154(b) by 381 days.

(21) Appl. No.: 18/683,546

(22) PCT Filed: Aug. 26, 2022

(86) PCT No.: PCT/EP2022/073758
§ 371 (c)(1),
(2) Date: Feb. 14, 2024

(87) PCT Pub. No.: WO2023/025929
PCT Pub. Date: Mar. 2, 2023

(65) Prior Publication Data

US 2025/0136510 A1 May 1, 2025

(30) Foreign Application Priority Data

Aug. 27, 2021 (EP) .................................... 21193476

(51) Int. Cl.
*C04B 24/26* (2006.01)
*C04B 14/10* (2006.01)
(Continued)

(52) U.S. Cl.
CPC ............ *C04B 24/267* (2013.01); *C04B 14/10* (2013.01); *C04B 14/28* (2013.01);
(Continued)

(58) Field of Classification Search
CPC ....... C04B 24/267; C04B 14/10; C04B 14/28; C04B 22/0013; C04B 22/0093;
(Continued)

(56) References Cited

U.S. PATENT DOCUMENTS 9,315,419 B2 4/2016 Gadt et al.
9,777,133 B2 10/2017 Gadt et al.
2025/0066248 A1 * 2/2025 Berres .................. C04B 24/383

FOREIGN PATENT DOCUMENTS

WO 2014013077 A1 1/2014
WO 2014131778 A1 9/2014
WO 2015110393 A1 7/2015
WO 2016207429 A1 12/2016

OTHER PUBLICATIONS

International Search Report for Application No. PCT/EP2022/073758 dated Dec. 15, 2022.
International Written Opinion for Application No. PCT/EP2022/073758 dated Dec. 15, 2022.
Li Ran et al: "Effectiveness of PCE superplasticizers in calcined clay blended cements", Cement and Concrete Research, Pergamon Press, Dec 24, 2020, vol. 141, Elmsford, NY, US.
Schmid Marlene et al: "Dispersing performance of different kinds of polycarboxylate (PCE) superplasticizers in cement blended with a calcined clay", Construction and Building Materials, May 29, 2020, vol. 258, p. 119576, Netherlands.
(Continued)

*Primary Examiner* — Anthony J Green
(74) *Attorney, Agent, or Firm* — Curatolo Sidoti & Trillis Co., LPA; Salvatore A. Sidoti; Floyd Trillis, III

(57) ABSTRACT

A colloidal polymer inorganic hybrid material is used as an additive for a construction composition comprising a binder system, the binder system comprising a cementitious binder and at least one supplementary cementitious material, wherein the supplementary cementitious material(s) comprise(s) a calcined clay material, the clay material including at least one non-kaolinitic clay material. The hybrid material comprises at least one polyvalent metal cation, at least one polymeric dispersant which comprises anionic and/or anionogenic groups and polyether side chains, at least one anion which is able to form a low-solubility salt with the polyvalent metal cation, wherein the polyvalent metal cation is present in an amount corresponding to the following formula (1):

$$0.10 \leq \frac{\sum_i z_{K,i} \times n_{K,i}}{\varphi \times m_D} \leq 15 \tag{1}$$

and the anion is present in an amount corresponding to the following formula (2):

$$0.01 \leq \frac{\sum_l z_{A,l} \times n_{A,l}}{\sum_i z_{K,i} \times n_{K,i}} \leq 1 \tag{2}$$

wherein φ is the charge density of the polymeric, $m_D$ is the amount of polymeric dispersant, $z_{K,i}$ is the valency of the polyvalent metal cation, $n_{K,i}$ is the molar amount of the polyvalent metal cation, $z_{A,l}$ is the valency of the anion, $n_{A,l}$ is the molar amount of the anion, the indices i, and l are independent of one another and are an integer greater than 0, i is the number of different kinds of polyvalent metal cations and l is the number of different kinds of anions which are able to form a low-solubility salt with the metal cation. The use of the colloidal polymer inorganic hybrid material allows for an effective slump retention.

27 Claims, 2 Drawing Sheets

(51) Int. Cl.

| | |
|---|---|
| ***C04B 14/28*** | (2006.01) |
| ***C04B 22/00*** | (2006.01) |
| ***C04B 22/14*** | (2006.01) |
| ***C04B 22/16*** | (2006.01) |
| ***C04B 28/04*** | (2006.01) |
| ***C04B 103/00*** | (2006.01) |
| ***C04B 103/40*** | (2006.01) |

(52) U.S. Cl.

CPC ...... *C04B 22/0013* (2013.01); *C04B 22/0093* (2013.01); *C04B 22/142* (2013.01); *C04B 22/16* (2013.01); *C04B 24/2647* (2013.01); *C04B 28/04* (2013.01); *C04B 2103/002* (2013.01); *C04B 2103/0021* (2013.01); *C04B 2103/408* (2013.01)

(58) Field of Classification Search

CPC ... C04B 22/142; C04B 22/16; C04B 24/2647; C04B 28/04; C04B 2103/002; C04B 2103/0021; C04B 2103/408; C04B 40/0039; Y02W 30/91

See application file for complete search history.

(56) References Cited

OTHER PUBLICATIONS

Sposito Ricarda et al: "Characteristics of components in calcined clays and their influence on the efficiency of superplasticizers", Cement and Concrete Composites, Mar. 16, 2020, vol. 110, p. 103594.

Schmid Marlene et al: "Interaction of individual meta clays with polycarboxylate (PCE) superplasticizers in cement investigated via dispersion, zeta potential and sorption measurements", Applied Clay Science, Apr. 24, 2021, vol. 207, Elsevier, Amsterdam, NL.

Ng Serina et al: "Influence of dispersing agents on the rheology and early heat of hydration of blended cements with high loading of calcined marl", Cement and Concrete Composites, Elsevier Applied Science, Apr. 18, 2015, vol. 60, pp. 123-134, Barking, GB.

Ma Yihan et al: "Research progress on 1-15 polycarboxylate based superplasticizers with tolerance to clays—A review", Construction and Building Materials, May 4, 2020, vol. 255, Elsevier, Netherlands.

* cited by examiner

USE OF A COLLOIDAL POLYMER INORGANIC HYBRID MATERIAL AS A CONSTRUCTION COMPOSITION ADDITIVE

CROSS REFERENCE TO RELATED APPLICATIONS

This application is a national stage application of International Application No. PCT/EP2022/073758, filed 26 Aug. 2022, which claims the benefit of the filing date of European Application Serial No. 21193476.5, filed 27 Aug. 2021, both of which applications are incorporated herein by reference.

The present invention relates to the use of a colloidal polymer inorganic hybrid material as an additive for a construction composition comprising a cementitious binder and a calcined clay material. The invention further relates to a construction composition comprising a cementitious binder, a calcined clay material and said colloidal polymer inorganic hybrid material.

Clinker reduction in commercially available cements plays a major role for cement companies due to rising $CO_2$ taxes and environmental impact of clinker production. Suitable SCMs (Supplementary Cementitious Materials) like ground blast furnace slag, fly ash, silica fume, metakaolin, natural pozzolan, burnt oil shale, etc. as partial replacement of clinker will not cover the rising cement demand in the future. Calcined clay has proven to be a suitable SCM used in cement due to its good availability, lower $CO_2$ impact and latent-hydraulic activity. The globally known acronyms for this approach are LC2 and LC3. LC2 stands for Limestone-Calcined Clay and this system works like a SCM filler in concrete/mortar production. LC3 stands for Limestone-Calcined-Clay-Cements, where calcined clay is part of the cement constituents. LC3s are disclosed in, e.g., U.S. Pat. No. 5,626,665, CA 2 968 007 and US 2019/0144334.

The use of calcined clay materials as a partial substitute of Portland cement allows for cuts in $CO_2$ emissions at comparable concrete strength achieved by conventional Portland cements. Aluminosilicates occurring in calcined clay have only limited solubility in an alkaline aqueous environment and, in addition, dissolve only very slowly. A much slower kinetic turnover is to be expected that needs days, or even weeks, to reach its maximum. The calcined clays contribute to the overall physical performance and/or durability of LC3 concrete only after prolonged periods of time. Calcined clays, unlike ordinary Portland cement, do not contribute significantly to the early strength development within the first few hours after mixing.

Although calcined clays have previously been used as pozzolans, calcination makes the economics of substitution marginal in a conventional pozzolanic blend. It was found that a coupled substitution of cement with calcined clay and limestone allows much higher levels of substitution. Combination of calcined clay with limestone allows higher levels of substitution down to clinker contents of around 50% with similar mechanical properties and improvement in some aspects of durability. The replacement of clinker with limestone in these blends lowers both the cost and the environmental impact, see Cement and Concrete Research, Volume 114, December 2018, 49-56.

It is known that dispersants are added to aqueous slurries of hydraulic and/or mineral binders for improving their workability. Additives of this kind are able to prevent the agglomeration by dispersing existing particles and those newly formed by hydration, and in this way to improve the workability (fluidity, pumpability, viscosity, self-compacting ability, spray ability, finish ability). In order to reduce the fraction of excess water for a given processing consistency and/or to improve the processing properties for a given water/binder ratio, additives are used which are generally referred to as water-reducing agents or plasticizers. Those which allow high levels of water reduction are known as high range water reducers or superplasticizers. Polycarboxylate ether type superplasticizers (PCEs) based on carboxyl-containing monomers and on polyethylene glycol-containing olefinic monomers are commonly used.

Water reducers, which produce plasticization of freshly prepared concrete when added in relatively low amounts, are to be distinguished from consistency agents or slump-maintaining additives, referred to below as slump retainers, which achieve the same initial plasticization, only when added at relatively high levels, but bring about a constant slump flow spread over time. In contrast to the addition of water reducers, the addition of slump retainers allows good processing properties being extended for up to, for example, 90 minutes after the mixing of the concrete, whereas with water reducers the processing properties deteriorate significantly after usually just 30 minutes.

It was found by R. Li et al., Cement and Concrete Research 141 (2021) 106334, that calcined clay increases the water demand of the blended cements considerably. Furthermore, PCEs which fluidize OPC (Ordinary Portland Cement) best also provide optimal performance in calcined clay blended cements, but require much higher dosages.

WO 2014/013077, WO 2014/131778, WO 2015/110393 and WO 2016/207429 disclose aqueous colloidally disperse preparations on the basis of polymeric dispersants which comprise anionic and/or anionogenic groups and polyether side chains for use as additives for hydraulically setting compositions.

The use of calcined clay in cement admixtures results in various drawbacks. Commonly used superplasticizers, like BNS (poly-betanaphthalene sulfonate) and PCEs, fail or at least require much higher dosages, especially if the calcined clay has a high specific surface area and/or high porosity. Furthermore, slump retention is short so that setting retarders often have to be used to maintain the workability over time. The dynamic viscosity of admixtures containing calcined clay is often found very high, which is related to sticky concrete mixes. Such mixes are commonly difficult to handle on job site. Additionally, the early strength development of concrete admixtures containing calcined clay was found to be low due to the reduction of clinker content and the use of setting retarders.

It has been found that the prior art methods and compositions are insufficient to provide construction compositions that meet the requirements of reduced $CO_2$-production and workability of hydraulic binders such as slump retention and early strength development.

The problem underlying the invention is therefore to provide additives for construction compositions which provide an effective slump retention, wherein the compositions comprise a binder system including a calcined clay material. A further problem is to provide additives for such construction compositions which provide an effective slump retention without significantly compromising the strength of the concrete or mortar, in particular the early strength. A further problem is to provide additives for such construction compositions, which additives are suitable to provide well-balanced properties to such construction compositions with regard to the workability of the mortar and cement prepared from the construction compositions.

It was found that the above problems are surprisingly solved with the use and compositions provided herein.

Thus, the present invention relates to the use of a colloidal polymer inorganic hybrid material as an additive for a construction composition comprising a binder system, the binder system comprising a cementitious binder and at least one supplementary cementitious material, wherein the supplementary cementitious material(s) comprise(s) a calcined clay material, the clay material comprising at least 10 wt.-% of calcined clay obtained from a non-kaolinitic clay, the hybrid material comprising at least one polyvalent metal cation selected from $Fe^{3+}$, $Fe^{2+}$, $Zn^{2+}$, $Mn^{2+}$, $Cu^{2+}$, $Mg^{2+}$, $Ca^{2+}$, $Sr^{2+}$, $Ba^{2+}$, and mixtures thereof, preferably from $Fe^{3+}$, $Fe^{2+}$, $Zn^{2+}$, $Mn^{2+}$, $Cu^{2+}$, $Ca^{2+}$, and mixtures thereof, an in particular from $Fe^{3+}$, $Fe^{2+}$, $Ca^{2+}$, and mixtures thereof at least one polymeric dispersant which comprises anionic and/or anionogenic groups and polyether side chains, at least one anion which is able to form a low-solubility salt with the polyvalent metal cation, wherein the anion is selected from carbonate, oxalate, silicate, phosphate, polyphosphate, phosphite, borate, aluminate, sulfate, and mixtures thereof, preferably from silicate, phosphate, polyphosphate, aluminate, and mixtures thereof, wherein the polyvalent metal cation is present in an amount corresponding to the following formula (1):

$$0.10 \le \frac{\sum_i z_{K,i} \times n_{K,i}}{\varphi \times m_D} \le 15 \qquad (1)$$

and the anion is present in an amount corresponding to the following formula (2):

$$0.01 \le \frac{\sum_l z_{A,l} \times n_{A,l}}{\sum_i z_{K,i} \times n_{K,i}} \le 1 \qquad (2)$$

wherein

φ is the charge density of the polymeric dispersant in meq/g of solid content, $m_D$ is the amount of polymeric dispersant in g of solid content, $z_{K,i}$ is the valency of the polyvalent metal cation, $n_{K,i}$ is the amount of the polyvalent metal cation in mmol, $z_{A,l}$ is the valency of the anion, $n_{A,l}$ is the amount of the anion in mmol, the indices i and l are independent of one another and are an integer greater than 0, i is the number of different kinds of polyvalent metal cations and l is the number of different kinds of anions which are able to form a low-solubility salt with the metal cation.

The numerator of the mathematical term in formula (1) is the valency of the polyvalent metal cation times the molar amount of the polyvalent metal cation, totalled over all polyvalent metal cations. Since the product of molar amount and valency is known as equivalents, the numerator has the unit equivalent (or milliequivalent, as the molar amount is provided in mmol). The denominator is the charge density of the polymeric dispersant in meq/g times the amount of polymeric dispersant in g. Hence, the denominator has the unit meq. Thus, the mathematical term in formula (1) is dimensionless. For analogous reasons, the mathematical term in formula (2) is dimensionless.

Anionic groups are the deprotonated acid groups present in the polymeric dispersant. Anionogenic groups are the acid groups present in the polymeric dispersant. Groups which are both anionic and anionogenic, such as partially deprotonated polybasic acid residues, are assigned exclusively to the anionic groups when forming the sum of the molar amounts of the anionic and anionogenic groups present in the polymeric dispersant.

The term "different kinds of polyvalent metal cations" refers to polyvalent metal cations of different elements. Furthermore, the term "different kinds of polyvalent metal cations" also refers to metal cations of the same element with different charge numbers.

In an embodiment, the polyvalent metal cation and the anion are present in an amount corresponding to the following formula (3):

$$0.25 \le \frac{\left(\sum_i z_{K,i} \times n_{K,i}\right)^2}{\left(\sum_l z_{A,l} \times n_{A,l}\right)(\varphi \times m_D)} \le 70. \qquad (3)$$

Both the numerator and the denominator of the mathematical term in formula (3) formally have the term $meq^2$. The mathematical term in formula (3) is hence dimensionless.

The ratio according to formula (1) is preferably in the range from 0.1 to 12, more preferably 0.15 to 10, most preferably 0.15 to 5.0, such as 0.15 to 2.0.

The ratio according to formula (2) is preferably in the range from 0.01 to 0.5, more preferably 0.01 to 0.4, even more preferably 0.015 to 0.4, most preferably 0.02 to 0.4.

The ratio according to formula (3) is preferably in the range from 0.5 to 70, more preferably 0.8 to 30, such as 1.0 to 15, most preferably 1.0 to 5.0.

Each range for formula (1) may be combined with each range for formula (2) and formula (3).

Preferably, the at least one polyvalent metal cation is selected from $Fe^{3+}$, $Fe^{2+}$, $Zn^{2+}$, $Mn^{2+}$, $Cu^{2+}$, $Ca^{2+}$, preferably from $Fe^{3+}$, $Fe^{2+}$, $Ca^{2+}$. In one embodiment, $Ca^{2+}$ contributes at least 10% of the value of $\Sigma_i z_{K,i} \times n_{K,i}$, preferably at least 40%, more preferably at least 70%, most preferably at least 90%. In a particularly preferred embodiment, the polyvalent metal cation is $Ca^{2+}$.

The counter-anion of the polyvalent metal cation salt (not the anion which is able to form a low-solubility salt with the polyvalent metal cation) is preferably selected such that the salts are readily water-soluble, the solubility under standard conditions of 20° C. and atmospheric pressure being preferably greater than 10 g/l, more preferably greater than 100 g/l and very particularly greater than 200 g/l. The numerical value of the solubility here relates to the solution equilibrium ($MX=Mn^+ + Xn^-$, where $Mn^+$: metal cation of the invention; $Xn^-$: anion) of the pure substance of the salt in deionised water at 20° C. under atmospheric pressure, and takes no account of the effects of protonation equilibriums (pH) and complexation equilibriums. The anions are preferably sulfate, or a singly charged counter-anion, preferably a nitrate, acetate, formate, hydrogen sulfate, halide, pseudohalide, methane sulfonate and/or amido sulfonate. The pseudohalides include cyanide, azide, cyanate, thiocyanate and fulminate. Double salts as well can be used as metal salt. Double salts are salts which have two or more different cations. An example is alum ($KAl(SO_4)_2 \cdot 12H_2O$) which is suitable as an aluminium salt. The metal cation salts with the aforementioned counter-anions are readily water-soluble and hence especially suitable, since relatively high concentrations of the aqueous metal salt solutions (as reactant) can be established.

In a further embodiment, the at least one anion which is able to form a low-solubility salt with the polyvalent metal cation is selected from carbonate, oxalate, silicate, phosphate, polyphosphate, phosphite, borate, aluminate, and sulfate, preferably silicate, phosphate, polyphosphate, and aluminate, and in particular from aluminate and mixtures thereof with at least one of silicate, phosphate, or polyphosphate. In one embodiment, aluminate contributes at least 10% of the value of $\Sigma_l\ z_{A,l} \times n_{A,l}$, preferably at least 40%, more preferably at least 70%, most preferably at least 90%.

The expression "low-solubility salt" means a salt whose solubility in water under standard conditions of 20° C. and atmospheric pressure is less than 5 g/L, preferably less than 1 g/L.

The stated anions also include the polymeric borate, silicate and oxalate anions, and also the polyphosphates. The term "polymeric anions" refers to anions which as well as oxygen atoms comprise at least two atoms from the group consisting of boron, carbon, silicon and phosphorus. With particular preference they are oligomers having a number of atoms of between 2 and 20, more particularly preferably 2 to 14 atoms, most preferably 2 to 5 atoms. The number of atoms in the case of the silicates is more preferably in the range from 2 to 14 silicon atoms, and in the case of the polyphosphates it is more preferably in the range from 2 to 5 phosphorus atoms.

A preferred silicate is waterglass, with a modulus, defined as the ratio of $SiO_2$ to alkali metal oxide, in the range from 1:1 to 4:1, more preferably 1:1 to 3:1, for example $Na_2SiO_3$.

The counter-cation of the anion salt which is able to form a low-solubility salt with the polyvalent metal cation is preferably a singly charged cation or a proton, preferably an alkali metal cation and/or ammonium ion. The ammonium ion may also comprise an organic ammonium ion, examples being alkyl ammonium ions having one to four alkyl radicals. The organic radical may also be of aromatic type or comprise aromatic radicals. The ammonium ion may also be an alkanol ammonium ion.

In the polymeric dispersant, anionic groups are the deprotonated acid groups present in the polymeric dispersant. Anionogenic groups are the acid groups present in the polymeric dispersant. Groups which are both anionic and anionogenic, such as partially deprotonated polybasic acid residues, are assigned exclusively to the anionic groups when forming the sum of the molar amounts of the anionic and anionogenic groups present in the polymeric dispersant. The anionic and anionogenic groups are preferably carboxyl, carboxylate or phosphate groups, hydrogenphosphate or dihydrogenphosphate groups.

The inorganic hybrid material in general has a pH in the range from 9 to 12, preferably 9.5 to 11.5, more preferably 10.5 to 11.5. if required, the pH is adjusted with a base, for example NaOH, KOH, an organic amine, polyamine or ammonia.

In one embodiment, the polymeric dispersant is a polymer which comprises structural units (I) of the general formulae (Ia), (Ib), (Ic) and/or (Id):

(Ia)

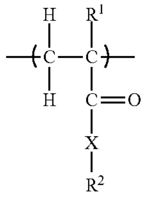

wherein $R^1$ is H, $C_1$-$C_4$ alkyl, $CH_2COOH$ or $CH_2CO$—X—$R^{3A}$, preferably H or methyl;

X is NH—$(C_{n1}H_{2n1})$ or O—$(C_{n1}H_{2n1})$ with n1=1, 2, 3 or 4, the nitrogen atom or the oxygen atom being bonded to the CO group;

$R^2$ is OM, $PO_3M_2$, or O—$PO_3M_2$, preferably OM, or O—$PO_3M_2$; or

X is a chemical bond and $R^2$ is OM;

$R^{3A}$ is $PO_3M_2$, or O—$PO_3M_2$, preferably O—$PO_3M_2$;

(Ib)

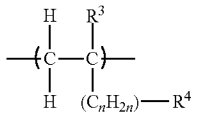

wherein $R^3$ is H or $C_1$-$C_4$ alkyl, preferably H or methyl;

n is 0, 1, 2, 3 or 4, preferably 0 or 1;

$R^4$ is $PO_3M_2$, or O—$PO_3M_2$;

(Ic)

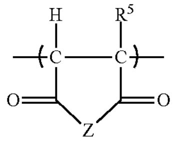

wherein $R^5$ is H or $C_1$-$C_4$ alkyl, preferably H;

Z is O or $NR^7$, preferably O;

$R^7$ is H, $(C_{n1}H_{2n1})$—OH, $(C_{n1}H_{2n1})$—$PO_3M_2$, $(C_{n1}H_{2n1})$—$OPO_3M_2$, $(C_6H_4)$—$PO_3M_2$, or $(C_6H_4)$—$OPO_3M_2$, and n1 is 1, 2, 3 or 4, preferably 1, 2 or 3;

(Id)

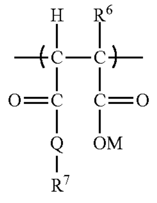

wherein $R^6$ is H or $C_1$-$C_4$ alkyl, preferably H;

Q is $NR^7$ or O, preferably O;

$R^7$ is H, $(C_{n1}H_{2n1})$—OH, $(C_{n1}H_{2n1})$—$PO_3M_2$, $(C_{n1}H_{2n1})$—$OPO_3M_2$, $(C_6H_4)$—$PO_3M_2$, or $(C_6H_4)$—$OPO_3M_2$, n1 is 1, 2, 3 or 4, preferably 1, 2 or 3;

where each M in the above formulae independently is H or a cation equivalent.

A preferred embodiment of the polymeric dispersant comprises as anionic or anionogenic group at least one structural unit of the formula (Ia) in which $R^1$ is H or $CH_3$, X is a chemical bond and $R^2$ is OM; and/or at least one structural unit of the formula (Ib) in which $R^3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.

Another preferred embodiment of the polymeric dispersant comprises as anionic or anionogenic group at least one structural unit of the formula (Ia) in which $R^1$ is H or $CH_3$ and $XR^2$ is OM or X is $O(C_nH_{2n})$ with n=1, 2, 3 or 4, more particularly 2, and $R^2$ is $O—PO_3M_2$.

With particular preference, the structural unit of formula Ia is a methacrylic acid or acrylic acid unit, i.e. $R^1$ is H or methyl, X is a chemical bond and $R^2$ is OM and M is H or a cation equivalent; the structural unit of formula Ic is a maleic anhydride unit, i.e. $R^5$ is H and Z is O; and the structural unit of formula Id is a maleic acid or maleic monoester unit, i.e. $R^6$ is H, Q is O and $R^7$ is H.

A more preferred polymeric dispersant comprises structural units of the general formulae (Ia) and/or (Id).

Where the monomers (I) are phosphoric esters or phosphonic esters, they may also include the corresponding diesters and triesters and also the monoester of diphosphoric acid. These esters come about in general during the esterification of organic alcohols with phosphoric acid, polyphosphoric acid, phosphorus oxides, phosphorus halides or phosphorus oxyhalides, and/or the corresponding phosphonic acid compounds, alongside the monoester, in different proportions, as for example 5-30 mol % of diester and 1-15 mol % of triester and also 2-20 mol % of the monoester of diphosphoric acid.

The general formulae (Ia), (Ib), (Ic) and (Id) may be identical or different not only within individual polymer molecules but also between different polymer molecules.

The polymer (additionally) comprises structural units (II) of the general formulae (IIa), (IIb), (IIc) and/or (IId):

(IIa)

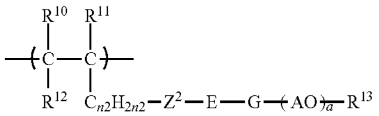

wherein $R^{10}$, $R^{11}$ and $R^{12}$ independently of one another are H or $C_1$-$C_4$ alkyl, preferably H or methyl;

$Z^2$ is O or S, preferably O;

E is $C_2$-$C_6$ alkylene, cyclohexylene, $CH_2—C_6H_{10}$, 1,2-phenylene, 1,3-phenylene or 1,4-phenylene, preferably $C_2$-$C_6$ alkylene or $C_2$-$C_4$ alkylene, and in particular $C_2$ alkylene;

G is O, NH or CO—NH, preferably O; or

E and G together are a chemical bond;

A is $C_2$-$C_5$ alkylene or $CH_2CH(C_6H_5)$, preferably $C_2$-$C_4$ alkylene or $C_2$-$C_3$ alkylene, and in particular $C_2$ alkylene;

n2 is 0, 1, 2, 3, 4 or 5, preferably 0, 1 or 2;

a is an integer from 2 to 350, preferably 10 to 150, more preferably 20 to 100;

$R^{13}$ is H, $C_1$-$C_4$ alkyl, $CO—NH_2$ or $COCH_3$;

(IIb)

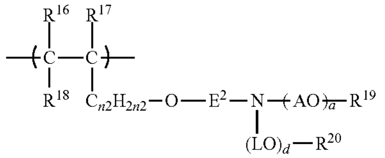

wherein $R^{16}$, $R^{17}$ and $R^{18}$ independently of one another are H or $C_1$-$C_4$ alkyl, preferably H;

$E^2$ is $C_2$-$C_6$ alkylene, cyclohexylene, $CH_2—C_6H_{10}$, 1,2-phenylene, 1,3-phenylene, or 1,4-phenylene, or is a chemical bond;

A is $C_2$-$C_5$ alkylene or $CH_2CH(C_6H_5)$, preferably $C_2$-$C_3$ alkylene, and in particular $C_2$ alkylene;

n2 is 0, 1, 2, 3, 4 or 5;

L is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

d is an integer from 1 to 350, preferably 10 to 150, more preferably 20 to 100;

$R^{19}$ is H or $C_1$-$C_4$ alkyl; and $R^{20}$ is H or $C_1$-$C_4$ alkyl;

(IIc)

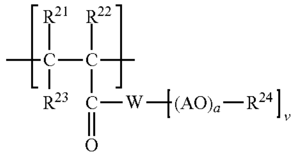

wherein $R^{21}$, $R^{22}$ and $R^{23}$ independently are H or $C_1$-$C_4$ alkyl, preferably H;

W is O, $NR^{25}$, or is N;

V is 1 if W=O or $NR^{25}$, and is 2 if W=N;

A is $C_2$-$C_5$ alkylene or $CH_2CH(C_6H_5)$, preferably $C_2$-$C_3$ alkylene, and in particular $C_2$ alkylene;

a is an integer from 2 to 350, preferably 10 to 150, more preferably 20 to 100;

$R^{24}$ is H or $C_1$-$C_4$ alkyl;

$R^{25}$ is H or $C_1$-$C_4$ alkyl;

(IId)

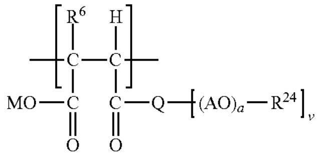

wherein $R^6$ is H or $C_1$-$C_4$ alkyl, preferably H;

Q is $NR^{10}$, N or O;

V is 1 if Q=O or $NR^{10}$ and is 2 if Q=N;

$R^{10}$ is H or $C_1$-$C_4$ alkyl;

$R^{24}$ is H or $C_1$-$C_4$ alkyl;

A is $C_2$-$C_5$ alkylene or $CH_2CH(C_6H_5)$, preferably $C_2$-$C_3$ alkylene; and in particular $C_2$ alkylene; and a is an integer from 2 to 350, preferably 10 to 150, more preferably 20 to 100;

where each M in the above formulae independently is H or a cation equivalent.

With particular preference, the structural unit of formula (IIa) is an alkoxylated isoprenyl unit, alkoxylated hydroxybutyl vinyl ether unit, alkoxylated (meth)allyl alcohol unit or a vinylated methylpolyalkylene glycol unit, in each case preferably with an arithmetic average of 4 to 340 oxyalkylene groups.

A polymeric dispersant with structural unit (IIa) is preferred. More preferred is a polymeric dispersant with structural unit (IIa), wherein $R^{10}$ and $R^{12}$ are H, $R^{11}$ is H or methyl, n2 is 0, 1 or 2, E is $C_2$-$C_6$ alkylene, G is O, or E and G together are a chemical bond, A is $CH_2$—$CH_2$ and $R^{13}$ is H.

The general formulae (IIa), (IIb), (IIc) and (IId) may be identical or different not only within individual polymer molecules but also between different polymer molecules. All structural units comprising group A may be identical or different both within individual polyether side chains and between different polyether side chains.

Besides the structural units of the formulae (I) and (II), the polymeric dispersant may also comprise further structural units, derived from radically polymerisable monomers, such as hydroxyethyl (meth)acrylate, hydroxypropyl (meth)acrylate, (meth)acrylamide, ($C_1$-$C_4$) alkyl (meth)acrylates, styrene, styrenesulphonic acid, 2-acrylamido-2-methylpropanesulphonic acid, (meth)allylsulphonic acid, vinylsulphonic acid, vinyl acetate, acrolein, N-vinylformamide, vinylpyrrolidone, (meth)allyl alcohol, isoprenol, 1-butyl vinyl ether, isobutyl vinyl ether, aminopropyl vinyl ether, ethylene glycol monovinyl ether, 4-hydroxybutyl monovinyl ether, (meth)acrolein, crotonaldehyde, dibutyl maleate, dimethyl maleate, diethyl maleate, dipropyl maleate, etc.

The polymeric dispersants comprising the structural units (I) and (II) are prepared in a conventional way, by means of radical polymerisation, for example. This is described for example in EP0894811, EP1851256, EP2463314, EP0753488.

The polymeric dispersant is a polycondensation product which comprises the structural units (III), (IV) and (V):

(III)

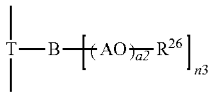

wherein

T is phenyl, naphthyl or heteroaryl having 5 to 10 ring atoms, of which 1 or 2 atoms are heteroatoms selected from N, O and S;

n3 is 1 or 2;

B is N, NH or O, with the proviso that n3 is 2 if B is N and n3 is 1 if B is NH or O;

A is $C_2$-$C_5$ alkylene or $CH_2CH(C_6H_5)$, preferably $C_2$-$C_3$ alkylene, and in particular $C_2$ alkylene;

a2 is an integer from 1 to 300;

$R^{26}$ is H, $C_1$-$C_{10}$ alkyl, $C_5$-$C_8$ cycloalkyl, aryl, or heteroaryl having 5 to 10 ring atoms, of which 1 or 2 atoms are heteroatoms selected from N, O and S;

where the structural unit (IV) is selected from the structural units (IVa) and (IVb) (IVa)

(IVa)

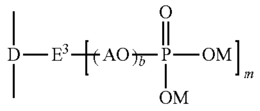

wherein

D is phenyl, naphthyl or heteroaryl having 5 to 10 ring atoms, of which 1 or 2 atoms are heteroatoms selected from N, O and S;

$E^3$ is N, NH or O, with the proviso that m is 2 if $E^3$ is N and m is 1 if $E^3$ is NH or O;

A is $C_2$-$C_5$ alkylene or $CH_2CH(C_6H_5)$, preferably $C_2$-$C_3$ alkylene, and in particular $C_2$ alkylene;

b is an integer from 0 to 300; and

M independently is H or a cation equivalent;

(IVb)

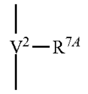

wherein $V^2$ is phenyl or naphthyl and is optionally substituted by 1 or two radicals selected from $R^8$, OH, $OR^8$, $(CO)R^8$, COOM, $COOR^8$, $SO_3R^8$ and $NO_2$;

$R^{7A}$ is COOM, $OCH_2COOM$, $SO_3M$ or $OPO_3M_2$;

M is H or a cation equivalent; and $R^8$ is $C_1$-$C_4$ alkyl, phenyl, naphthyl, phenyl-$C_1$-$C_4$ alkyl or $C_1$-$C_4$ alkylphenyl.

The structural units T and D in the general formulae (III) and (IV) in the polycondensation product are preferably derived from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, phenoxyacetic acid, salicylic acid, preferably from phenyl, where T and D may be selected independently of one another and may also each be derived from a mixture of the stated radicals. The groups B and E independently of one another are preferably O. All structural units A may be identical or different not only within individual polyether side chains but also between different polyether side chains. In one particularly preferred embodiment, A is $C_2H_4$.

In the general formula (III), a is preferably an integer from 3 to 200 and more particularly 5 to 150, and in the general formula (IV) b is preferably an integer from 1 to 300, more particularly 1 to 50 and more preferably 1 to 10. Furthermore, the radicals of the general formulae (III) or (IV) may independently of one another in each case possess the same chain length, in which case a and b are each represented by a number. In general it will be useful for mixtures with different chain lengths to be present, so that the radicals of the structural units in the polycondensation product have different numerical values for a and, independently, for b.

The polycondensation product of the invention frequently has a weight-average molecular weight (determined by SEC as described in the experimental part) of 5000 g/mol to 200 000 g/mol, preferably 10 000 to 100 000 g/mol und more preferably 15 000 to 55 000 g/mol.

The molar ratio of the structural units (III):(IV) is typically 4:1: to 1:15 and preferably 2:1 to 1:10. It is advantageous to have a relatively high fraction of structural units (IV) in the polycondensation product, since a relatively high negative charge of the polymers has a good influence on the stability of the aqueous colloidally disperse preparation. The molar ratio of the structural units (IVa):(IVb), when both are present, is typically 1:10 to 10:1 and preferably 1:3 to 3:1.

The polycondensation product comprises a further structural unit (V), which is represented by the formula below:

(V)

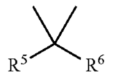

wherein $R^5$ is H, $CH_3$, COOH or substituted or unsubstituted phenyl or naphthyl;

$R^6$ is H, $CH_3$, COOH or substituted or unsubstituted phenyl or naphthyl.

Preferably $R_5$ and $R_6$ are H or one of the radicals $R_5$ and $R_6$ is H and the other is $CH_3$.

$R^5$ and $R^6$ in structural unit (V) are typically identical or different and are H, COOH and/or methyl. Very particular preference is given to H.

Preferably, the weight ratio of (III):(IV) is in the range of 2:98 to 40:60, preferably 5:95 to 30:70, more preferably 10:90 to 20:80. In general, the molar ratio of the structural units [(III)+(IV)]:(V) in the polycondensate is 1.0:0.7 to 1.0:1.3, preferably 1.0:0.8 to 1.0:1.2, more preferably 1.0:0.9 to 1.0:1.1.

The monomer with a keto group is preferably an aldehyde or ketone. Examples of monomers of the formula (V) are formaldehyde, acetaldehyde, acetone, glyoxylic acid and/or benzaldehyde. Formaldehyde is preferred.

The polycondensates are typically prepared by a process which comprises reacting with one another the compounds forming the basis for the structural units (III), (IV) and (V). The preparation of the polycondensate is for example described in WO 2006/042709 and WO 2010/026155.

The polymeric dispersant of the invention may also be present in the form of its salts, such as, for example, the sodium, potassium, organic ammonium, ammonium and/or calcium salt, preferably as the sodium and/or calcium salt.

The average molecular weight $M_w$ of the polymeric dispersant, as determined by Size Exclusion Chromatography (SEC; details are given below) is preferably 5000 to 200 000 g/mol, more preferably 10 000 to 80 000 g/mol, and very preferably 15 000 to 55 000 g/mol.

The average molecular weight $M_w$ of the polyether side chain of the polymeric dispersant, as determined by Size Exclusion Chromatography (SEC; details are given below) is preferably 500 to 8 000 g/mol, more preferably 1 000 to 5 000 g/mol.

The charge density φ of the polymeric dispersant is preferably in the range of 0.5 to 5.0 meq/g of solid content, more preferably in the range of 0.7 to 2.0 meq/g of solid content. The charge density can be determined by titration with a polycation as described for example in J. Plank and B. Sachsenhauser, Cem. Concr. Res. 2009, 39, 1-5. Moreover, the skilled person is capable of determining this value in a simple calculation from the initial weighings of monomers for the synthesis of the polymeric dispersant.

The colloidal polymer inorganic hybrid material (in the following hybrid material) preferably contains 3% to 50% by weight solids, more preferably 15% to 45% solid. The solids here comprise the polymer and also the polyvalent metal cation salt, and also the anion salt whose anion forms a low-solubility salt with the polyvalent metal cation.

The hybrid material is prepared generally by mixing the components, which are preferably in the form of an aqueous solution. In this case it is preferred first to mix the polymeric dispersant and the polyvalent metal cation and then to add the anion which is capable of forming a low-solubility salt with the polyvalent metal cation. According to another embodiment, the polymeric dispersant and the anion which is capable of forming a low-solubility salt with the polyvalent metal cation are mixed first, and then the polyvalent metal cation is added. To adjust the pH it is then possible to add a base. The pH is, in general, in the basic range, preferably in the range from 9 to 12, more preferably 9.5 to 11.5 and in particular 10.5 to 11.5. The components are mixed generally at a temperature in the range from 5 to 80° C., usefully 10 to 40° C., and more particularly at room temperature (about 20 to 30° C.).

The preparation of the hybrid material may take place continuously or batchwise. The mixing of the components is accomplished in general in a reactor with a mechanical stirring mechanism. The stirring speed of the stirring mechanism may be between 10 rpm and 2000 rpm. An alternative option is to mix the solutions using a rotor-stator mixer, which may have stirring speeds in the range from 1000 to 30 000 rpm. Furthermore, it is also possible to use different mixing geometries, such as a continuous process in which the solutions are mixed using a Y-mixer, for example.

If desired, a further step in the method may follow, for the drying of the hybrid material. Drying may be accomplished by roll drying, spray drying, drying in a fluidised bed process, by bulk drying at elevated temperature, or by other customary drying methods. The preferred range of the drying temperature lies between 5° and 230° C.

The preparation of the hybrid material is disclosed in detail in WO2014013077, WO2014131778, WO2015110393 and WO2016207429 which are incorporated herein by reference.

Thus, the hybrid material may take the form of an aqueous product in the form of a solution, emulsion or dispersion or in solid form, for example as a powder, after a drying step. The water content of the hybrid material in solid form is in that case preferably less than 10% by weight, more preferably less than 5% by weight. It is also possible for some of the water, preferably up to 10% by weight, to be replaced by organic solvents. Advantageous are alcohols such as ethanol, (iso)propanol and 1-butanol, including its isomers. Acetone can be used as well. By the use of the organic solvents it is possible to influence the solubility and hence the crystallization behaviour of the salts of the invention.

The hybrid material has an average particle size distribution value of 10 nm to 1000 μm, preferably 10 nm to 10 μm, as measured by Dynamic Light Scattering—see example section.

The invention further relates to a construction composition comprising a) a colloidal polymer inorganic hybrid material as defined above and b) a binder system, wherein the binder system comprises b1) a cementitious binder, b2) at least one supplementary cementitious material, wherein the supplementary cementitious material(s) comprise(s) a calcined clay material, and b3) optionally, at least one carbonate rock powder, preferably a calcium carbonate-containing carbonate rock powder, more preferably limestone.

In the binder system b), a variety of cementitious binders b1) can be used, for example Portland cement, calcium aluminate cement and sulfoaluminate cement. In an embodiment, the cementitious binder comprises a mixture of Portland cement and aluminate cement, or a mixture of Portland cement and sulfoaluminate cement or a mixture of Portland cement, aluminate cement and sulfoaluminate cement.

In general, the calcium silicate mineral phases and calcium aluminate mineral phases constitute at least 90 wt.-% of the cementitious binder b1). Further, the calcium silicate mineral phases preferably constitute at least 60 wt.-% of the cementitious binder b1), more preferably at least 65 wt.-%, most preferably 65 to 75 wt.-%.

Conveniently, the mineralogical phases are herein indicated by their cement notation. The primary compounds are represented in the cement notation by the oxide varieties: C for CaO, M for MgO, S for $SiO_2$, A for $Al_2O_3$, $ for $SO_3$, F for $Fe_2O_3$, and H for $H_2O$.

Suitably, the calcium silicate mineral phases are selected from C3S (alite) and C2S (belite). The calcium silicate mineral phases provide primarily final strength properties.

Suitably, the calcium aluminate mineral phases are selected from C3A, C4AF and C12A7, in particular C3A and C4AF.

In an embodiment, the cementitious binder b1) is Portland cement, in particular Ordinary Portland Cement (OPC). The term "Portland cement" denotes any cement compound containing Portland clinker, especially CEM I within the meaning of standard EN 197-1, paragraph 5.2. A preferred cement is Ordinary Portland Cement (OPC) according to DIN EN 197-1. The phases constituting Portland cement mainly are alite (C3S), belite (C2S), calcium aluminate (C3A), calcium ferroaluminate (C4AF) and other minor phases. Commercially available OPC may either contain calcium sulfate (<7 wt.-%) or is essentially free of calcium sulfate (<1 wt.-%).

The construction composition may contain 0.05 to 0.2 mol of total available aluminate per 100 g of cementitious binder, calculated as $Al(OH)_4^-$, from the calcium aluminate mineral phases.

In a further embodiment, the cementitious binder b1) has a Blaine surface area of at least 3800 $cm^2/g$, preferably at least 4500 $cm^2/g$, most preferably at least 5000 $cm^2/g$. The Blaine surface area is used as parameter for grinding fineness. Finer milling allows for higher reactivity. The Blaine surface area may be determined according to DIN EN 196-6.

Preferably, the construction composition comprises the cementitious binder b1) in an amount of 20 to 80 wt.-%, preferably 35 to 65 wt.-%, relative to the amount of the binder system b).

Generally, the amount of cementitious binder b1) in the construction composition is in the range from 5 to 20 wt.-%, preferably 10 to 18 wt.-%, relative to the solids content of the construction composition.

The construction composition comprises at least one calcined clay material as a supplementary cementitious material b2). Preferably, the calcined clay material has a Dv90 of less than 200 μm, preferably less than 150 μm, more preferably less than 70 μm, or less than 50 μm.

The Dv90 (by volume) corresponds to the $90^{th}$ percentile of the particle size distribution, meaning that 90% of the particles have a size of the Dv90 or smaller and 10% have a size larger than the Dv90. Generally, the Dv90 and other values of the same type, which are characteristic of the granulometric profile (volume distribution) of a collection of particles or grains can be determined by laser granulometry for particle sizes less than 200 μm, or by sieving for particle sizes greater than 200 μm. Nevertheless, when individual particles have a tendency to aggregate, it is necessary to determine their size by electron microscopy.

Calcined clay materials are obtained by heat treatment of clays, which contain phyllosilicates, i.e. sheet silicates. Phyllosilicates include 1:1 and/or 2:1 layered (natural) clays or mixtures thereof, comprising di- and/or trioctahedral sheets or mixtures thereof and a layer charge of 0, e.g., kaolinite, up to a negative layer charge of 1, e.g. mica or mixtures thereof. Heat treatment of the clay converts the clay minerals by dehydroxylation with release of water. For example, kaolinite may be heat treated to obtain metakaolin ($Al_2Si_2O_7$). The obtained calcined clay material is a naturally derived pozzolan. Clays derived from natural deposits to prepare calcined clays can vary in composition and crystalline structure in a broad range. For the purpose of the present invention, a calcined clay is any material prepared by heat treatment of clay, that provides a pozzolanic reactivity. As the composition, crystalline structure, fineness and the processing conditions like temperature and time of heat applied can vary significantly, the reactivity of calcined clays consequently can differ significantly as well.

For the purpose of the invention, the calcined clay material is a material obtained by calcination of a clay material including at least one non-kaolinitic clay material. While pure metakaolin is a preferred supplementary cementitious material, deposits of pure kaolinite are rarely found, and pure metakaolin is hence expensive. Crude kaolin is of widely varying ore quality and comprises, besides kaolinite, other clay minerals or clay-like minerals. In construction compositions, a calcined clay material obtained from a clay material including at least one non-kaolinitic clay material may be employed. It is understood that the calcined clay material of the invention may be obtained from clay materials comprising non-kaolinitic clay material as well as kaolinitic clay material, or from clay materials comprising non-kaolinitic clay materials only. This opens the possibility of using clays which are much more widely available than kaolinite.

Kaolinitic clay materials include members of the kaolin group, such as kaolinite, dickite, nacrite or halloysite.

The most relevant non-kaolinitic clay materials which can be used as such or in association with kaolinitic clay materials in order to produce calcined clay materials belong to the smectite group, such as dioctahedral smectites like montmorillonite, nontronite, or trioctahedral smectites like saponite;

mica group such as illite, paragonite, ephesite, margarite, or clintonite;

chlorite group such as clinochlore or chamosite;

pyrophyllite-talc group such as talc or pyrophyllite and vermiculite.

In an embodiment, the non-kaolinitic clay material comprises at least one clay belonging to the smecticte group and/or illite clay.

The calcined clay material is from a clay material that includes a more than trace amount of at least one non-kaolinitic clay material. These may be medium- or low-grade kaolin clays or non-kaolin clays. The calcined clay material comprises at least 10 wt.-%, preferably at least 15 wt.-%, more preferably at least 20 wt.-%, most preferably at least 30 wt.-% of calcined clay obtained from a non-kaolinitic clay.

An example of a natural clay composition comprises 40 to 45% of illite clay, 25 to 30% of kaolinite clay and 25 of 30% smectite group clay. There are other natural clays that do not comprise kaolinite, for instance compositions comprising 85 to 90% of smectite group clay and 10 to 15% of illite clay.

Calcination changes the clay structure from crystalline to amorphous. The degree to which clay undergoes changes in its crystalline form may depend on the amount of heat to which it is subjected. It is preferable to heat-treat the clay at a temperature sufficient to dehydroxylate the clay to a crystallographically amorphous material while preventing the formation of crystalline high temperature aluminosilicate phases such as mullite. Amorphous phases (or ill defined crystalline phases) are highly reactive phases which are readily activated. Relatively high amounts of amorphous calcium aluminate phases have a positive impact on late strength development of mortars and concretes, e.g., after 28 days. In a preferred embodiment, the calcined clay has an amorphous content in the range from 10 to 100 wt.-%, preferably 20 to 70 wt.-%, as determined by quantitative XRD analysis (Rietveld).

The pozzolanic reactivity of a supplementary cementitious material, including calcined clays, can be measured by calorimetric analysis on blended cements; see Development of a New Rapid, Relevant and Reliable (R3) Testing Method to Evaluate the Pozzolanic Reactivity of Calcined Clays, Rilem Bookseries 2015, DOI:10.1007/978-94-017-9939-3_67. A cement model paste is prepared by mixing 11.11 g of the supplementary cementitious material (SCM), 33.33 g of portlandite, 60 g of deionized water, 0.24 g of potassium hydroxide, 1.20 g of potassium sulfate and 5.56 g of calcite. The heat release is recorded over the course of 7 days.

The cumulative heat ("Heat") is calculated from 1.2 hours after the beginning of the calorimetry test onwards. The total heat release ("$H_{rescaled}$") is reported in J/(g SCM) as follows:

$$H_{rescaled} = \frac{\text{Heat}}{(m_p \times 0.0997)},$$

wherein Heat is the cumulative heat in Joule and $m_p$ is the mass of the cement model paste in gram.

Useful calcined clay materials exhibit a total heat release in the pozzolanic reactivity test of 100 to 600 J/g, in particular 150 to 400 J/g.

In one embodiment, the calcined clay material is a material obtained by heat treating a clay at a temperature of 400 to 1,000° C., preferably 500 to 900° C., more preferably 600 to 850° C.

In one embodiment, the calcined clay material has a BET value, as measured in accordance with DIN ISO 9277, in the range from 0.1 to 60 $m^2/g$, preferably 1 to 50 $m^2/g$, and in particular 1 to 40 $m^2/g$.

The calcined clay is generally comprised in an amount of 5 to 80 wt.-%, preferably 5 to 50 wt.-%, relative to the amount of the binder system b).

Besides the calcined clay material, the construction composition may contain up to 25 wt.-% of supplementary cementitious material(s), relative to the amount of binder system b), such as alkali-activatable binders.

The term "alkali-activatable binder" is meant to designate materials which in an aqueous alkaline environment set in a cement-like fashion. The term encompasses materials that are commonly referred to as "latent hydraulic binders" or "pozzolanic binders". A "latent hydraulic binder" is preferably a binder in which the molar ratio (CaO+MgO):$SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof. The "pozzolanic binders" can generally be selected from amorphous silica, preferably precipitated silica, fumed silica and microsilica, ground glass, aluminosilicates, fly ash, preferably brown-coal fly ash and hard-coal fly ash, natural pozzolans such as tuff, trass and volcanic ash, burnt shale, rice husk ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 500 $m^2$ $kg^{-1}$. Finer milling gives higher reactivity.

The expression "blast furnace slag" is intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2$ $g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 15 to 30 $m^2$ $g^{-1}$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

The construction composition may comprise an inorganic pigment. Suitable inorganic pigments include iron oxides, titanium dioxide, cobalt-chrome-aluminum-spinels, and chrome(III)-oxides such as chrome green. Preferably, inorganic pigments do not constitute more than 5 wt.-%, preferably not more than 3 wt.-%, of the total amount of the binder system b).

In a preferred embodiment, the construction composition comprises at least one carbonate rock powder b3). Suitable carbonate rock powders b3) include ground or precipitated carbonate rock powders. Preferably, the carbonate rock powder b3) has a particle size distribution by weight as determined by Laser Scattering Particle Size Analysis characterized by $D_{50}$ in the range of 100 nm to 200 μm, preferably 1 μm to 20 μm.

Suitable carbonate rock powders include ground or precipitated limestone, dolomitic limestone, calcite, aragonite, travertine, marble, carbonate-silicate schist, schistose impure marble, vaterite, dolomite; and alkaline earth metal carbonates, e.g., magnesium carbonate and barium carbonate. Also envisaged are finely crushed recycled aggregates obtained from Construction and Demolition Waste (CDW). The carbonate rock powder b3) is preferably a calcium carbonate-containing carbonate rock powder, more preferably limestone. Carbonate rock powders consist of finely crushed carbonate rock and are abundantly available. The carbonate powder preferably comprises at least 50 wt.-%, more preferably at least 70 wt.-% and in particular at least 90 wt.-% calcium carbonate, in particular limestone.

The amount of carbonate rock powder b3), if present, is in general 6 to 35 wt.-%, preferably 15 to 30 wt.-%, relative to the amount of the binder system b).

In one embodiment, the calcined clay material is a material obtained by heat treating a clay in the essential absence of carbonate rock powder. After calcination, the calcined clay material is mixed with the carbonate rock powder and the cementitious binder to obtain the binder system of the invention. By heat treating the clay material separately from the carbonate rock powder, no chemical reaction occurs between the clay minerals and the carbonate rock powder.

In another embodiment, a mixture of a clay material and a carbonate rock powder is heat treated in such a way that no chemical reaction occurs between the clay minerals and the carbonate material prior to mixing with the cementitious binder. This case can occur when a carbonate rock is naturally present in the clay-based feedstock, and/or it can be added intentionally for process needs. A way of ensuring that no chemical reaction occurs between the clay material and the carbonate rock powder is by calcinating the mixture at a temperature of less than 800° C., and preferably less than 700° C.

In one embodiment, the binder system has a BET value, as measured in accordance with DIN ISO 9277, in the range from 0.1 to 40 $m^2/g$, preferably 1 to 30 $m^2/g$.

The cementitious binder b1), in particular Portland cement in its commercially available form, typically contains small amounts of a sulfate source. The construction composition may, in addition to the sulfate present in the cementitious binder b1), contain up to 15 wt.-%, preferably up to 5 wt.-% of an extraneous sulfate source b4), relative to the amount of the binder system b). The construction composition may comprise a total amount of sulfate from the cementitious binder b1) and the extraneous sulfate source b4) of up to 20 wt.-%, preferably up to 10 wt.-%, relative to the amount of the binder system b).

In general, the extraneous sulfate source may be a calcium sulfate source, preferably selected from calcium sulfate dihydrate, anhydrite, α- and β-hemihydrate, i.e. α-bassanite and β-bassanite, or mixtures thereof. Preferably the calcium sulfate source is α-bassanite and/or β-bassanite. Other sulfate sources are alkali metal sulfates like potassium sulfate or sodium sulfate. Preferably, the sulfate source b4) is a calcium sulfate source.

The construction composition may comprise a filler material which can be for example silica, quartz, sand, crushed marble, glass spheres, granite, basalt, sandstone, feldspar, gneiss, alluvial sands, any other durable aggregate, and mixtures thereof. In general, the filler materials do not work as a binder, i.e., do not participate in the chemical hardening reaction.

The invention also relates to the construction composition according to the invention in freshly mixed form, i.e. comprising water. Preferably, the ratio of water to binder system b) is in the range of 0.2 to 0.9, preferably in the range of 0.25 to 0.7.

The construction composition may be provided as a dry mix to which water is added on-site to obtain the freshly mixed construction composition. Alternatively, the construction composition may be provided as a ready-mixed or freshly mixed composition.

The aqueous freshly mixed construction composition is obtainable by mixing a powdery component containing the cementitious binder, the at least one supplementary cementitious material comprising the calcined clay material, and optionally a carbonate rock powder; and a liquid aqueous component, wherein the colloidal polymer inorganic hybrid material is contained in the liquid aqueous component.

In another embodiment, the colloidal polymer inorganic hybrid material is added to the cementitious binder beforehand. To this end, the colloidal polymer inorganic hybrid material is added as an essentially dry product to the cementitious binder or under conditions that a powdered conditioned cementitious binder is obtained. For example, an aqueous preparation of the colloidal polymer inorganic hybrid material is used as a grinding aid when grinding cement clinker. This procedure allows for the production of a ready-to-use performance-enhanced cementitious binder system overcoming the disadvantages of high water demand, poor rheology and low early strength development of the resulting construction composition.

The freshly mixed construction composition can be for example concrete, mortar or grouts.

The term "mortar" or "grout" denotes a cement paste to which are added fine aggregates, i.e. aggregates whose diameter is between 150 μm and 5 mm (for example sand), and optionally very fine aggregates. A grout is a mixture of sufficiently low viscosity for filling in voids or gaps. Mortar viscosity is high enough to support not only the mortar's own weight but also that of masonry placed above it. The term "concrete" denotes a mortar to which are added coarse aggregates, i.e. aggregates with a diameter of greater than 5 mm.

The construction composition according to the invention is useful in applications such as producing building products, in particular for concretes such as on-site concrete, finished concrete parts, manufactured concrete parts (MCP's), pre-cast concrete parts, concrete goods, cast concrete stones, concrete bricks, in-situ concrete, ready-mix concrete, air-placed concrete, sprayed concrete/mortar, concrete repair systems, 3D printed concrete/mortar, industrial cement flooring, one-component and two-component sealing slurries, slurries for ground or rock improvement and soil conditioning, screeds, filling and self-levelling compositions, such as joint fillers or self-levelling underlayments, high performance concrete (HPC) and ultra high performance concrete (UHPC), hermetic fabricated concrete slabs, architectural concrete, tile adhesives, renders, cementitious plasters, adhesives, sealants, cementitious coating and paint systems, in particular for tunnels, waste water drains, screeds, mortars, such as dry mortars, sag resistant, flowable or self-levelling mortars, drainage mortars and concrete, or repair mortars, grouts, such as joint grouts, non-shrink grouts, tile grouts, injection grouts, wind-mill grouts (wind turbine grouts), anchor grouts, flowable or self-levelling grouts, ETICS (external thermal insulation composite systems), EIFS grouts (Exterior Insulation Finishing Systems, swelling explosives, waterproofing membranes or cementitious foams.

BRIEF DESCRIPTION OF THE DRAWINGS

The invention is described in more details by the accompanying drawings and the subsequent examples.

EXAMPLES

Analytical Methods

Size Exclusion Chromatography (SEC)

Figure 1:
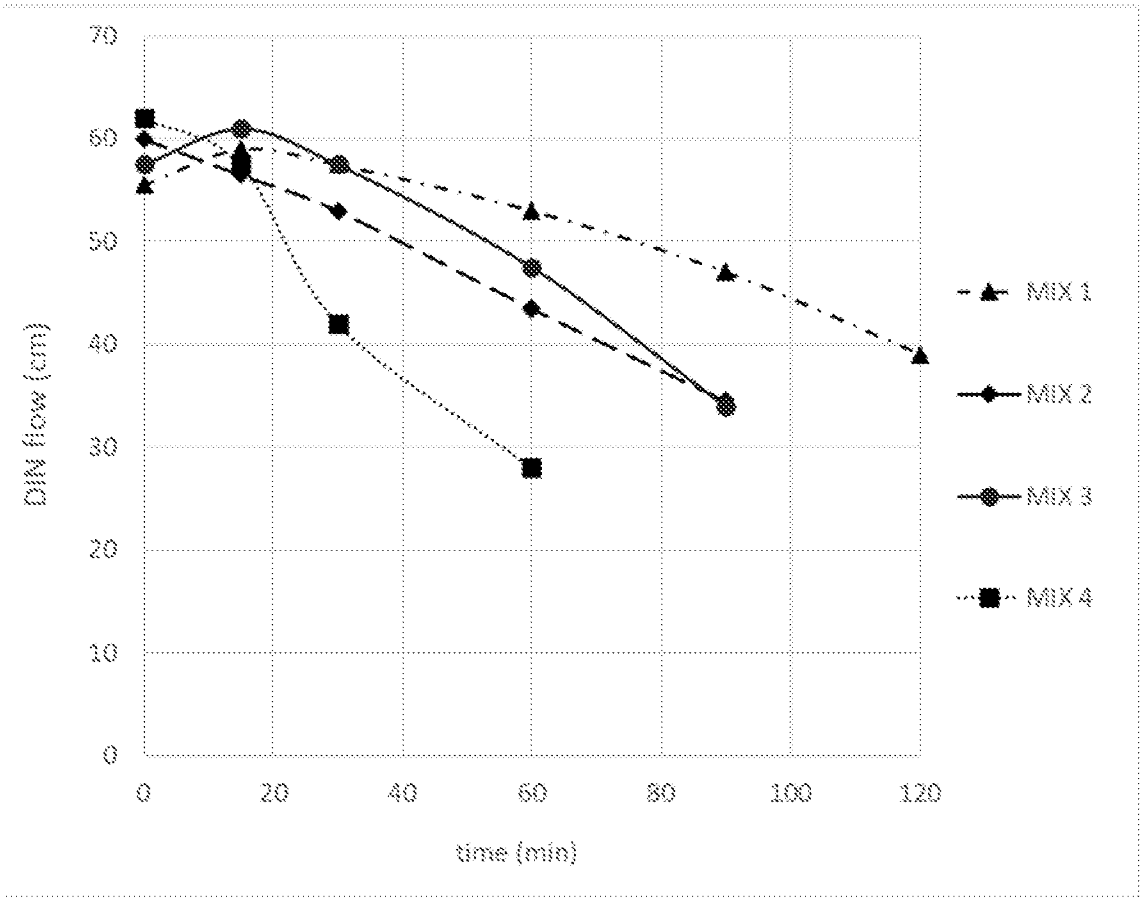
FIG. 1 shows the results of a flow table test according to DIN EN 12350-5 for different mortars with conventional superplasticizers.

The polymer solution was dissolved in the SEC eluent indicated below to yield a polymer concentration of 0.5 wt.-%. Subsequently, the solution was filtered through a syringe filter with a nylon membrane having a pore size of 0.45 μm to obtain a filtrate. The injection volume of this filtrate was 100 μL. The average molecular weights were determined on an SEC instrument from Shimadzu with the model LC-10AD VP—CTO-10A VP, with a UV detector (SPD-10A—SHIMADZU) and an RI detector (RID-10A—SHIMADZU).

Columns: OH-Pak SB-G
Shodex OHpak-SB 804 HQ
Shodex OHpak-803 HQ
Shodex OHpak-802.5 HQ
Eluent: 0.05 M aq. ammonium formate/MeOH mixture (91/9 parts by volume)
Flow rate: 0.65 ml/min
Temperature: 60° C.
Injection: 100 μL
Detection: RI and UV (230 nm)

The molecular weights of the polymers were measured by external calibration with polyethylene glycols standards from PSS Polymer Standards Service GmbH. Determination took place first of all relative to polyethylene glycol standards from the company PSS Polymer Standards Service GmbH. The masses of the polyethylene glycol standards were 682000, 164000, 114000, 57100, 40000, 26100, 22100, 12300, 6240, 3120, 2010, 970, 430, 194, and 106 g/mol. The molecular weight distribution curves of the standards were determined by the supplier via light scattering.

Dynamic Light Scattering

The particle size distribution was determined using a Malvern Zetasizer Nano ZS (Malvern Instruments GmbH, Rigipsstr. 19, 71083 Herrenberg). The software utilised for measurement and evaluation was the Malvern software package belonging to the instrument. The measurement principle was based on dynamic light scattering, more particularly on non-invasive backscattering. The particle size distribution measured corresponded to the hydrodynamic diameter Dh of the conglomerate composed of comb polymer, i.e., water reducer and inorganic core consisting of cations of the invention and anions of the invention.

The results of the measurements were an intensity distribution against the particle size. From this distribution, the software determined an average particle size. The algorithm used was stored in the Malvern software. The samples were measured after 1 to 10 days. For this measurement, 0.1% by weight solutions of the conglomerates composed of water reducer and cation of the invention and anion of the invention were used. The solvent used was Milli-Q water, i.e., ultra-pure water having a resistance of 18.2 mΩ cm. The sample was introduced into a single-use plastic cuvette and subjected to measurement at a temperature of 25° C. 10 runs/measurement and 2 measurements per sample were carried out. The only results evaluated were those which had a sufficiently high data quality, i.e., which corresponded to the standards of the instrument software.

Pozzolanic Reactivity Test

A cement model paste is prepared by mixing 11.11 g of the supplementary cementitious material (SCM), 33.33 g of portlandite (lab-grade, less than 5 wt.-% of $CaCO_3$), 60 g of deionized water, 0.24 g of potassium hydroxide (lab-grade), 1.20 g of potassium sulfate (lab-grade) and 5.56 g of calcite (lab-grade, $d_{50}$ 5 to 15 μm). All raw materials were preheated at 40° C. overnight before mixing.

A calorimeter was set to 40° C. followed by calibration of the heat flow channels. Then, sealed reference flasks (containing approx. 9.4 g of deionized water to match the heat capacity of the samples) were inserted into the calorimeter and the system was left to stabilize (about 2 days). The baseline heat flows (both initial and final baseline) of each channel were determined for 180 min. Approximately 15 g ($m_p$) of the freshly mixed cement model paste was introduced into heated sample flasks just after the mixing.

The heat release is recorded over the course of 7 days. The cumulative heat ("Heat") is calculated from 1.2 hours after the beginning of the calorimetry test onwards. The total heat release ("$H_{rescaled}$") is reported in J/(g SCM) as follows:

$$H_{rescaled} = \frac{\text{Heat}}{(m_p \times 0.0997)},$$

wherein Heat is the cumulative heat in Joule and $m_p$ is the mass of the cement model paste in gram. 0.0997 is the weight fraction of the supplementary cementitious material in the paste sample.

Mortar Slump Retention

The procedure is analogous to DIN EN 12350-2, with the modification that a mini-slump cone (height: 15 cm, bottom width: 10 cm, top width: 5 cm) was used instead of a conventional Abrams cone. 2 L of the aqueous freshly mixed construction composition were filled into the mini-slump cone. The cone was filled completely immediately after mixing. Afterwards, the cone was placed on a flat surface, and lifted, and the slump of the mortar mix was measured. The slump of all mixes was adjusted to 11 cm by adjusting the dosage of the superplasticizer to allow for comparability.

Early Strength Development for Mortars

The adjusted mortar mixes were each filled into mortar steel prisms (16/4/4 cm), and after 24 h at a temperature of 20° C. and relative humidity of 98%, a hardened mortar prism was obtained. The hardened mortar prism was demolded and compressive strength was measured according to DIN EN 196-1.

Compressive Strength of Concrete

Different concrete mixes were prepared containing the same amount of water and 380 kg/$m^3$ of total binder b).

The concretes were mixed for four minutes in a Pemat ZK 50 concrete mixer. Superplasticizer was added after 2 minutes in 20% of the rest water. The required dosages are shown in the legend indicated as % bwob (by weight of binder system based on active matter, relative to the solids content).

Compressive strength was measured after 24 h and 28 d after mixing the concrete according to DIN EN 12390-3.

Concrete Flow and Concrete Slump Retention

The flow table test according to DIN EN 12350-5 was used for measuring the flow at different times after concrete mixing.

Synthesis of Polymeric Dispersants

The polymeric dispersant P1 was based on the monomers acrylic acid, maleic acid and vinyloxybutylpolyethylene glycol 2000 g/mol. The molar ratio of acrylic acid to maleic acid was 5.3. Mw=34000 g/mol (determined by SEC). The solids content was 50% by weight. The synthesis of this type of polymer is described in WO 2010/066470.

The polymeric dispersant P2 was a blend of two polymers: P2a (58 wt.-%) and P2b (42 wt.-%). P2a was polymeric dispersant P1. P2b was based on the monomers acrylic acid and isoprenyloxypolyethylene glycol 1100 g/mol. Mw=25000 g/mol (determined by SEC). The solids content was 50% by weight.

The polymeric dispersant P3 was a condensate of the building blocks phenolpolyethylene glycol 1500 g/mol and phenoxyethanol phosphate. The molecular weight was 19000 g/mol. The synthesis is described in DE102004050395. The solids content was 50%.

The polymeric dispersant P4 was based on the monomers acrylic acid and vinyloxybutylpolyethylene glycol 3000 g/mol. Mw=62000 g/mol (determined by SEC). The solids content was 50% by weight.

The polymeric dispersant P5 was based on the monomers acrylic acid and vinyloxybutylpolyethylene glycol 3000 g/mol. Mw=43000 g/mol (determined by SEC). The solids content was 46% by weight.

The polymeric dispersant P6 was a blend of two polymers: P6a (83 wt.-%) and P6b (17 wt.-%). P6a was polymeric dispersant P1. P6b was based on the monomers acrylic acid, maleic acid and vinyloxybutylpolyethylene glycol 5800 g/mol. The molar ratio of acrylic acid to maleic acid was 10.3. Mw=32000 g/mol (determined by SEC). The solids content was 45% by weight. The synthesis of this type of polymer is described in WO 2010/066470.

The polymeric dispersant P7 was a blend of two polymers: P7a (86 wt.-%) and P7b (14 wt.-%). P7a was polymeric dispersant P1. P7b was based on the monomers acrylic acid, maleic acid and isoprenyloxypolyethylene glycol 1100 g/mol. Mw=43000 g/mol (determined by SEC). The solids content was 56% by weight.

Composition of Calcined Clays

XRD composition of two different calcined clays used for concrete testing are provided in Table 1. Amounts are provided in wt.-% of the calcined clay.

TABLE 1

| | Liament [1] | Arginotec [2] |
|---|---|---|
| $CaCO_3$ (calcite) | 2.5 | 1.8 |
| $CaMg(CO_3)_2$ (dolomite) | 1.9 | 0.3 |
| glimmer (sericite/muscovite) clay (illite) | 12.3 | 24.5 |

TABLE 1-continued

| | Liament [1] | Arginotec [2] |
|---|---|---|
| kaolinite | 0.6 | 2.0 |
| feldspar | 6.0 | 8.0 |
| gehlenite | 2.3 | — |
| other minerals (oxides) | 3.2 | 1.9 |
| $SiO_2$ (quartz) | 19.7 | 34.4 |
| amorphous content (slag, fly ash, pozzolans) | 51.5 | 27.1 |
| BET surface area [$m^2$/g] | 4.114 | 27.797 |

[1] Producer: Liapor GmbH und Co. KG

[2] Producer: Arginotec GmbH und Co. KG

1. Preparation of Hybrid Materials

The aqueous solutions of the polymeric dispersants described above were mixed with sodium aluminate ($NaAlO_2$), calcium nitrate ($Ca(NO_3)_2$), and sodium hydroxide to reach the target pH under stirring. Mixing was carried out in a 1 L glass beaker with magnetic stirrer at 300 rpm, temperature conditioned at 20° C.

First, the solution of the polymeric dispersant was diluted with water. Subsequently, sodium aluminate was added and dissolved with stirring. Then, calcium nitrate was added under stirring. The alkaline agent was subsequently added until the target pH was reached. Amounts are indicated in Tables 2 and 3. All amounts are based on the active content.

The hybrid materials of the invention proved to be storage stable. In particular, the samples of Tables 2 and 3 were stored for 6 months at 40° C., 20° C. and 4° C. The hybrid materials of the invention, as well as comparative additives A20 and A21, proved to be stable with respect to phase separation and retained their activity as slump retainers. Conversely, comparative additives A18 and A19 were found to be instable, forming a precipitate within 24 h of storage.

TABLE 2

| additive | polymer | side chain molecular weight [g/mol] | charge density [meq/g, dry] | solids content [%] | pH |
|---|---|---|---|---|---|
| A1 | P1 | 2000 | 0.99 | 39.12 | 11.0 |
| A2 | P1 | 2000 | 0.99 | 39.35 | 10.5 |
| A3 | P1 | 2000 | 0.99 | 21.65 | 10.5 |
| A4 | P1 | 2000 | 0.99 | 21.27 | 10.0 |
| A5 | P1 | 2000 | 0.99 | 22.57 | 9.5 |
| A6 | P1 | 2000 | 0.99 | 23.33 | 10.0 |
| A7 | P1 | 2000 | 0.99 | 39.22 | 10.5 |
| A8 | P1 | 2000 | 0.99 | 8.50 | 10.5 |
| A9 | P1 | 2000 | 0.99 | 6.01 | 10.5 |
| A10 | P2 | mixed, 1100 to 2000 | 1.34 | 39.22 | 10.5 |
| A11 | P3 | 1500 | 0.62 | 28.00 | 10.0 |
| A12 | P4 | 3000 | 0.73 | 33.83 | 10.0 |
| A13 | P5 | 3000 | 0.85 | 34.16 | 10.0 |
| A14 | P5 | 3000 | 0.85 | 33.80 | 9.5 |
| A15 | P5 | 3000 | 0.85 | 19.47 | 10.0 |
| A16 | P6 | mixed, 2000 to 5800 | 1.05 | 23.16 | 10.5 |
| A17 | P7 | mixed, 1100 to 2000 | 1.10 | 22.54 | 10.5 |
| A18 | P1 | 2000 | 0.99 | 44.59 | 11.0 |
| A19 | P1 | 2000 | 0.99 | 26.75 | 11.5 |
| A20 | P1 | 2000 | 0.99 | 24.38 | 11.5 |
| A21 | P4 | 3000 | 0.73 | 33.64 | 10.2 |

TABLE 3

| additive | polymer [%, relative to solids content] | metal cation [%, relative to solids content] | inorganic anion [%, relative to solids content] | ratio of formula (1) | ratio of formula (2) | ratio of formula (3) |
|---|---|---|---|---|---|---|
| A1 | 36.11 | 2.60 | 0.42 | 0.89 | 0.26 | 3.43 |
| A2 | 36.85 | 2.15 | 0.35 | 0.72 | 0.26 | 2.78 |
| A3 | 19.98 | 1.44 | 0.23 | 0.88 | 0.26 | 3.41 |
| A4 | 19.92 | 1.16 | 0.19 | 0.72 | 0.26 | 2.76 |
| A5 | 20.00 | 0.28 | 0.04 | 0.17 | 0.26 | 0.67 |
| A6 | 19.92 | 3.15 | 0.26 | 1.95 | 0.14 | 14.41 |
| A7 | 33.40 | 5.71 | 0.11 | 2.11 | 0.03 | 65.88 |
| A8 | 5.48 | 2.60 | 0.42 | 5.85 | 0.26 | 22.59 |
| A9 | 2.99 | 2.60 | 0.42 | 10.72 | 0.26 | 41.42 |
| A10 | 21.70 | 0.75 | 0.12 | 0.32 | 0.26 | 1.22 |
| A11 | 20.02 | 7.50 | 0.48 | 3.68 | 0.10 | 35.46 |
| A12 | 29.52 | 4.11 | 0.20 | 2.31 | 0.08 | 28.82 |
| A13 | 29.71 | 4.11 | 0.35 | 1.99 | 0.14 | 14.69 |
| A14 | 29.50 | 4.07 | 0.23 | 1.99 | 0.09 | 21.61 |
| A15 | 15.02 | 4.11 | 0.35 | 3.94 | 0.14 | 29.06 |
| A16 | 20.20 | 2.74 | 0.22 | 1.63 | 0.13 | 12.62 |
| A17 | 19.58 | 2.74 | 0.22 | 1.67 | 0.13 | 12.88 |
| A18 * | 17.43 | 23.40 | 3.76 | 16.54 | 0.26 | 63.91 |
| A19 * | 19.92 | 2.87 | 3.96 | 1.59 | 2.22 | 0.72 |
| A20 * | 19.92 | 0.50 | 3.96 | 0.28 | 12.75 | 0.02 |
| A21 * | 29.52 | 4.11 | 0.02 | 2.31 | 0.009 | 268.02 |

* comparative examples

2. Compressive Strength of OPC- and LC3-Based Mortars

Table 4 shows two mortars according to DIN EN 196-1, with 1.350 g of sand (norm sand according to DIN EN 196-1) and a water to binder ratio 0.50. In particular, the difference in early compressive strength are examined for an Ordinary Portland Cement (Aalborg Portland, OPC, CEM I 52.5 N) in comparison to an LC3 system which achieves strength class 52.5 at 28 days, comprising OPC (as above), 16 to 18 wt.-% of calcined clay, and 16 to 18 wt.-% of limestone.

TABLE 4

| cement | additive | water to binder system ratio | compressive strength (24 h, 20° C.) |
|---|---|---|---|
| OPC | — | 0.50 | 28.2 MPa |
| LC3 system | — | 0.50 | 19.5 MPa |

It is evident that early strength is significantly diminished in the LC3 system with calcined clay.

3. Slump, Flow and Compressive Strength of Mortar with and without Inventive Additive Table 5 shows the influence of a traditional additive based on a superplasticizer and a retarder (abbreviated as T1) in comparison to an additive according to the invention on slump, flow and compressive strength. The results were carried out in mortar with the OPC and binder system of the previous experiment (Point 2 of Experimental Section). The sand was a siliceous sand with a granulometry from 0 to 4 mm (origin: Po river; available from Sabbie di Parma Srl). The water to binder system ratio was 0.44 in all three examples.

As the traditional additive T1, a mixture of the polymer P2b (side chain molecular weight 1000 g/mol, charge density 1.70 mmol/g (dry), solids content 20 wt.-%) and sodium gluconate (solids content 5 wt.-%) was used. The weight ratio of P2b/sodium gluconate was 4/1. The total solids contents of the additive T1 was 25 weight %.

The air entrainment of the mixes was controlled by adding a standard defoamer in an amount of 1 wt.-%, based on the amount of colloidal polymer inorganic hybrid material, relative to the solids content, for all the tests. The air percentage measured according EN 1015-7 was in the range of 3 to 4 vol.-%.

TABLE 5

| # | binder system | additive | slump/flow 0 min [cm] | slump/flow 30 min [cm] | slump/flow 60 min [cm] | compressive strength (24 h, 20° C.) |
|---|---|---|---|---|---|---|
| 5-1 [1] | OPC [2] | T1 0.20% bwob | 9.5/14.0 | 6.5/11.0 | 5.0/10.0 | 25 MPa |
| 5-2 [1] | LC3 system [2] | T1 0.35% bwob | 9.0/12.0 | 7.5/11.0 | 6.0/10.5 | 17 MPa |
| 5-3 | LC3 system [2] | A2 0.28% bwob | 8.0/12.0 | 8.5/13.0 | 8.5/12.5 | 24 MPa |
| 5-4 [1] | LC3 system [2] | P1 0.25% bwob | 8.5/11.0 | 6.0/10.0 | 5.0/10.0 | 21 MPa |
| 5-5 [1] | LC3 system [2] | A18 0.27% bwob | 8.5/11.0 | 7.5/10.5 | 6.5/10.5 | 23 MPa |

TABLE 5-continued

| # | binder system | additive | slump/flow 0 min [cm] | slump/flow 30 min [cm] | slump/flow 60 min [cm] | compressive strength (24 h, 20° C.) |
|---|---|---|---|---|---|---|
| 5-6 [1] | LC3 system [2] | A20 0.25% bwob | 8.5/11.0 | 6.0/10.5 | 5.5/10.0 | 22 MPa |

[1] comparative example
[2] as defined under item 2.
bwob: by weight of binder system based on active matter, relative to the solids content
mix design: 511 g of binder as indicated and 1460 g of siliceous sand (0 to 4 mm)

As can be seen, the hybrid material of the invention significantly improves slump and flow retention after 30 min and after 60 min. Furthermore, the early compressive strength is comparable to that obtained by using OPC. The slump retention of A20 is not improved over the polymeric dispersant P1 (i.e. the polymeric dispersant contained in the colloidal polymer inorganic hybrid material A20), demonstrating the critical importance of formula (2).

4. Slump, Flow and Compressive Strength of Concrete with and without Inventive Additive Two different calcined clays were used in the study, namely Liament and Arginotec (see Table 1) having different amorphous content and physisorption BET (results provided by XRD Rietveld analysis, BET measurements and laser granulometric measurements). As a limestone source, MS12 limestone powder from SH Minerals (ground limestone; D50: 5.5 μm) was used. The calcined clay containing mixes included two different calcium sulfate sources (gypsum and anhydrite).

Further, two different superplasticizers additives were used in the tests:

Additive A2 as described above was used, i.e., a colloidal polymer inorganic hybrid material according to the invention. Furthermore, a conventional superplasticizer S1 was used, which was a polymer based on the monomers acrylic acid, hydroxypropyl acrylate and isoprenyloxypolyethylene glycol 1000 and 5800 g/mol. The molar ratio of acrylic acid to hydroxypropyl acrylate was 2.1. Mw=38000 g/mol, as determined by SEC. The solids content was 51% by weight).

Figure 2:
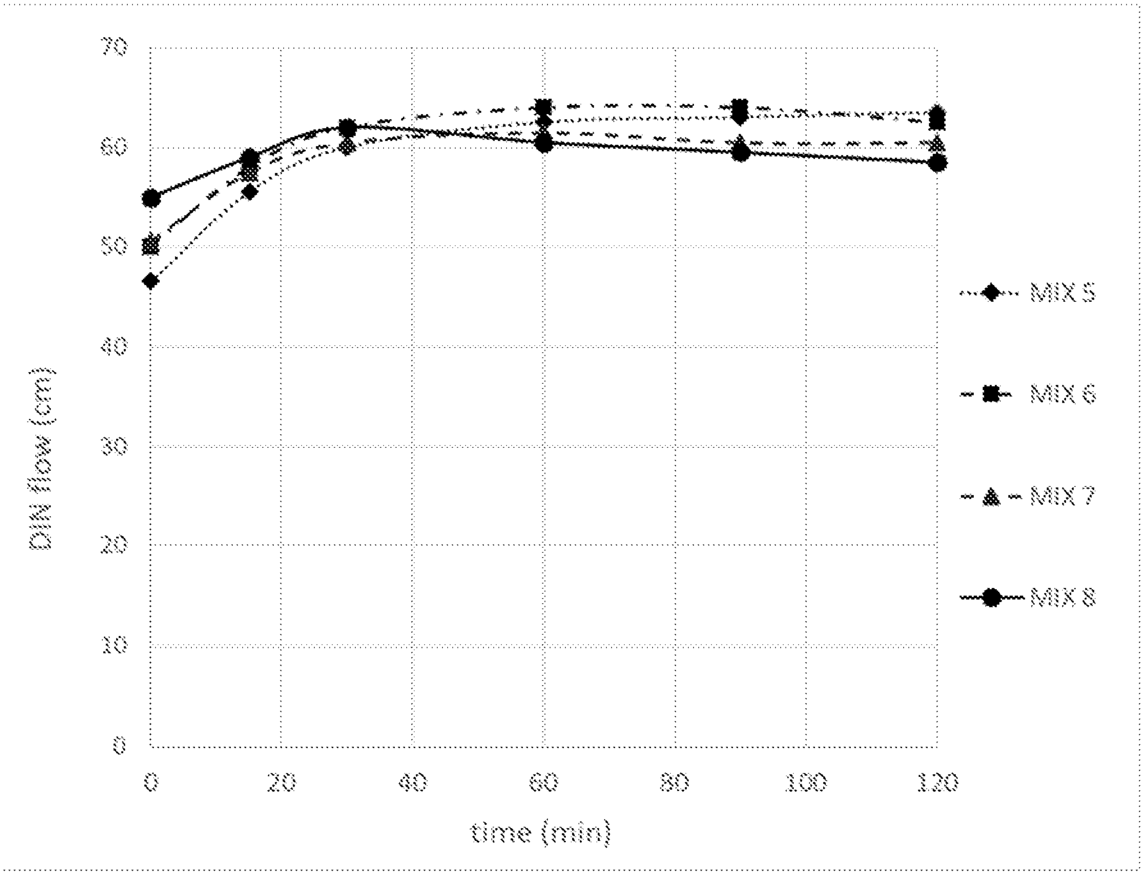
FIG. 2 shows the results of a flow table test according to DIN EN 12350-5 for different mortars with colloidal polymer inorganic hybrid materials according to the invention.

The compositions are given in Table 6, whereas the results are provided in FIGS. 1 and 2, as well as in Table 7.

TABLE 6

| # | Cement | Limestone Source | Calcined Clay | Extraneous Sulfate Source | Additive |
|---|---|---|---|---|---|
| MIX 1 [1] | OPC [2] 190 kg/m$^3$ | MS12 57 kg/m$^3$ | Liament 114 kg/m$^3$ | anhydrite 19 kg/m$^3$ | S1 0.26% bwob |
| MIX 2 [1] | OPC [2] 190 kg/m$^3$ | MS12 57 kg/m$^3$ | Liament 114 kg/m$^3$ | FGD gypsum [3] 19 kg/m$^3$ | S1 0.26% bwob |
| MIX 3 [1] | OPC [2] 190 kg/m$^3$ | MS12 57 kg/m$^3$ | Arginotec 114 kg/m$^3$ | anhydrite 19 kg/m$^3$ | S1 0.52% bwob |
| MIX 4 [1] | OPC [2] 190 kg/m$^3$ | MS12 57 kg/m$^3$ | Arginotec 114 kg/m$^3$ | FGD gypsum [3] 19 kg/m$^3$ | S1 0.46% bwob |
| MIX 5 | OPC [2] 190 kg/m$^3$ | MS12 57 kg/m$^3$ | Liament 114 kg/m$^3$ | anhydrite 19 kg/m$^3$ | A2 0.30% bwob |
| MIX 6 | OPC [2] 190 kg/m$^3$ | MS12 57 kg/m$^3$ | Liament 114 kg/m$^3$ | FGD gypsum [3] 19 kg/m$^3$ | A2 0.30% bwob |
| MIX 7 | OPC [2] 190 kg/m$^3$ | MS12 57 kg/m$^3$ | Arginotec 114 kg/m$^3$ | anhydrite 19 kg/m$^3$ | A2 0.65% bwob |
| MIX 8 | OPC [2] 190 kg/m$^3$ | MS12 57 kg/m$^3$ | Arginotec 114 kg/m$^3$ | FGD gypsum [3] 19 kg/m$^3$ | A2 0.57% bwob |

[1] comparative example
[2] Mergelstetten CEM I 52.5R
[3] gypsum from flue-gas desulphurization
bwob: by weight of cement based on active matter, relative to the solids content
mix design: 154 L/m$^3$ water, 1095 kg/m$^3$ river sand (0-4 mm natural sand and crushed aggregates (2-16 mm) obtained from Piederstorfer (origin: South-East Bavaria).

FIG. 1 shows that in all tested mix designs slump and flow are significantly diminished over time when using the conventional superplasticizer S1(w/b=0.41).

FIG. 2 shows that slump is maintained when using colloidal polymer inorganic hybrid materials according to the invention (A1, w/b=0.41). The concretes prepared with the colloidal polymer inorganic hybrid materials show similar slump retention independently of which calcium sulfate source (gypsum or anhydrite) and which calcined clay was used. Thus, the robustness of the hybrid material of the invention towards workability retention is far better than with the conventional superplasticizer when mixed into different calcined clay containing concretes.

TABLE 7

| | Compressive Strength [MPa] | |
|---|---|---|
| | After 24 h | After 28 d |
| MIX 1 | 12.25 | 69.95 |
| MIX 5 | 14.06 | 80.45 |
| MIX 2 | 11.62 | 67.05 |
| MIX 6 | 13.75 | 76.65 |
| MIX 3 | 15.10 | 62.40 |
| MIX 7 | 16.85 | 72.50 |
| MIX 4 | 13.95 | 57.50 |
| MIX 8 | 17.65 | 67.55 |

Table 7 shows that early strength development (24 h) of mixes containing calcined clay is very low compared to reference mixes 1 and 2 based on Ordinary Portland Cement. However, it was found that all tested LC3 mixes containing the hybrid material of the invention had higher 24 h strength and 28 d strength compared to the mixes with the conventional superplasticizer. Thus, the hybrid material of the invention has a positive impact on early and late strength development in LC3 based concrete mixes.

5. Concrete Compressive Strength with and without Inventive Additive

Additional concrete tests were carried out with the traditional superplasticizer T1 and with the hybrid material A2 of the invention. In Table 8, the mix design is provided for the experiments.

TABLE 8

| | dosage [kg/m$^3$] |
|---|---|
| binder | 300 |
| limestone powder* | 80 |
| river sand, 0 to 4 mm** | 1107 |
| gravel, 12 to 19 mm*** | 738 |
| effective water | 171 |
| water to binder system ratio | 0.57 |

*ground limestone (D50: 39.56 μm) obtained from Granulati Dolomitici Peroglio Spa (origin: North-East Italy)
**sand obtained from Mosole Spa (origin: North-East Italy)
***crushed aggregates obtained from Mosole Spa (origin: North-East Italy)

The results are provided in Table 9. In all experiments, initial air entrainment was 1.5%.

TABLE 9

| # | cement | additive (active dosage based on 100% solids content) | density [kg/m$^3$] | compressive strength (24 h, 20° C.) |
|---|---|---|---|---|
| 5-1 [1] | OPC | T1 (0.875 kg/m$^3$) | 2429 | 19.7 MPa |
| 5-2 [1] | LC3 system [2] | T1 (1.2 kg/m$^3$) | 2420 | 10.5 MPa |
| 5-3 | LC3 system [2] | additive A2 (0.6 kg/m$^3$) | 2473 | 17.0 MPa |

[1] comparative example
[2] as defined under Point 2 of the Experimental Section: "Compressive Strength of OPC- and LC3-Based Mortars"

It is evident that the hybrid material of the invention significantly improves early strength as compared to the LC3 system.

The invention claimed is:

1. A method of preparing a construction composition comprising a binder system, the method comprising adding a colloidal polymer inorganic hybrid material to the binder system, the binder system comprising a cementitious binder and at least one supplementary cementitious material, wherein the supplementary cementitious material comprises a calcined clay material, comprising at least 10 wt.-% of calcined clay obtained from a non-kaolinitic clay, the hybrid material comprising at least one polyvalent metal cation selected from $Fe^{3+}$, $Fe^{2+}$, $Zn^{2+}$, $Mn^{2+}$, $Cu^{2+}$, $Mg^{2+}$, $Ca^{2+}$, $Sr^{2+}$, $Ba^{2+}$, and mixtures thereof, at least one polymeric dispersant which comprises anionic and/or anionogenic groups and polyether side chains, at least one anion which together with the polyvalent metal cation is able to form a low-solubility salt having a solubility in water under standard conditions of 20° C. and atmospheric pressure less than 5 g/L, wherein the anion is selected from carbonate, oxalate, silicate, phosphate, polyphosphate, phosphite, borate, aluminate, sulfate, and mixtures thereof, wherein the polyvalent metal cation is present in an amount corresponding to the following formula (1):

$$0.10 \le \frac{\sum_i z_{K,i} \times n_{K,i}}{\varphi \times m_D} \le 15 \quad (1)$$

and the anion is present in an amount corresponding to the following formula (2):

$$0.01 \le \frac{\sum_l z_{A,l} \times n_{A,l}}{\sum_i z_{K,i} \times n_{K,i}} \le 1 \quad (2)$$

wherein

φ is the charge density of the polymeric dispersant in meq/g of solid content, $m_D$ is the amount of polymeric dispersant in g of solid content, $z_{K,i}$ is the valency of the polyvalent metal cation, $n_{K,i}$ is the amount of the polyvalent metal cation in mmol, $z_{A,1}$ is the valency of the anion, $n_{A,1}$ is the amount of the anion in mmol, the indices i, and 1 are independent of one another and are an integer greater than 0, i is the number of different kinds of polyvalent metal cations and 1 is the number of different kinds of anions which are able to form a low-solubility salt with the metal cation.

2. The method according to claim 1, wherein the polyvalent metal cation and the anion are present in an amount corresponding to the following formula (3):

$$0.25 \le \frac{\left(\sum_i z_{K,i} \times n_{K,i}\right)^2}{\left(\sum_l z_{A,l} \times n_{A,l}\right)(\varphi \times m_D)} \le 70. \quad (3)$$

3. The method according to claim 1, wherein the polyvalent metal cation is selected from $Fe^{3+}$, $Fe^{2+}$, $Zn^{2+}$, $Mn^{2+}$, $Cu^{2+}$, $Ca^{2+}$, and mixtures thereof.

4. The method according to claim 1, wherein the anion which is able to form a low-solubility salt with the polyvalent metal cation is selected from silicate, phosphate, polyphosphate, aluminate, and mixtures thereof.

5. The method according to claim 1, wherein the charge density φ of the polymeric dispersant is in the range of $0.5 \times 10^{-3}$ to 5.0 meq/g of solid content.

6. The method according to claim 1, wherein the polymeric dispersant comprises structural units of the general formulae (Ia), (Ib), (Ic) and/or (Id):

(Ia)

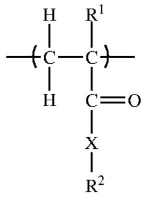

wherein $R^1$ is H, $C_1$-$C_4$ alkyl, $CH_2COOH$ or $CH_2CO$—X—$R^{3A}$;

X is NH—$(C_{n1}H_{2n1})$ or O—$(C_{n1}H_{2n1})$ with n1=1, 2, 3 or 4, the nitrogen atom or the oxygen atom being bonded to the CO group;

$R^2$ is OM, $PO_3M_2$, or O—$PO_3M_2$; or

X is a chemical bond and $R^2$ is OM;

$R^{3A}$ is $PO_3M_2$, or O—$PO_3M_2$;

(Ib)

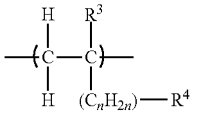

wherein $R^3$ is H or $C_1$-$C_4$ alkyl;

n is 0, 1, 2, 3 or 4;

$R^4$ is $PO_3M_2$, or O—$PO_3M_2$;

(Ic)

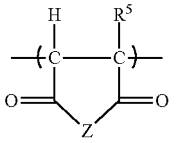

wherein $R^5$ is H or $C_1$-$C_4$ alkyl;

Z is O or $NR^7$;

$R^7$ is H, $(C_{n1}H_{2n1})$—OH, $(C_{n1}H_{2n1})$—$PO_3M_2$, $(C_{n1}H_{2n1})$—$OPO_3M_2$, $(C_6H_4)$—$PO_3M_2$, or $(C_6H_4)$—$OPO_3M_2$, and n1 is 1, 2, 3 or 4;

(Id)

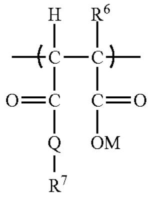

wherein $R^6$ is H or $C_1$-$C_4$ alkyl;

Q is $NR^7$ or O;

$R^7$ is H, $(C_{n1}H_{2n1})$—OH, $(C_{n1}H_{2n1})$—$PO_3M_2$, $(C_{n1}H_{2n1})$—$OPO_3M_2$, $(C_6H_4)$—$PO_3M_2$, or $(C_6H_4)$—$OPO_3M_2$, n1 is 1, 2, 3 or 4;

where each M independently is H or a cation equivalent; and structural units of the general formulae (IIa), (IIb), (IIc) and/or (IId):

(IIa)

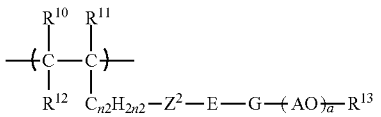

wherein $R^{10}$, $R^{11}$ and $R^{12}$ independently of one another are H or $C_1$-$C_4$ alkyl;

$Z^2$ is O or S;

E is $C_2$-$C_6$ alkylene, cyclohexylene, $CH_2$-$C_6H_{10}$, 1,2-phenylene, 1,3-phenylene or 1,4-phenylene;

G is O, NH or CO—NH; or

E and G together are a chemical bond;

A is $C_2$-$C_5$ alkylene or $CH_2CH$ $(C_6H_5)$;

n2 is 0, 1, 2, 3, 4 or 5;

a is an integer from 2 to 350;

$R^{13}$ is H, an unbranched or branched $C_1$-$C_4$ alkyl group, CO—$NH_2$ or $COCH_3$;

(IIb)

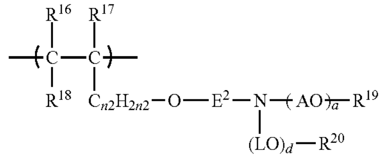

wherein $R^{16}$, $R^{17}$ and $R^{18}$ independently of one another are H or $C_1$-$C_4$ alkyl;

$E^2$ is $C_2$-$C_6$ alkylene, cyclohexylene, $CH_2$-$C_6H_{10}$, 1,2-phenylene, 1,3-phenylene, or 1,4-phenylene, or is a chemical bond;

A is $C_2$-$C_5$ alkylene or $CH_2CH$ $(C_6H_5)$;

n2 is 0, 1, 2, 3, 4 or 5;

L is $C_2$-$C_5$ alkylene or $CH_2CH$ $(C_6H_5)$;

a is an integer from 2 to 350;

d is an integer from 1 to 350;

$R^{19}$ is H or $C_1$-$C_4$ alkyl; and $R^{20}$ is H or $C_1$-$C_4$ alkyl;

(IIc)

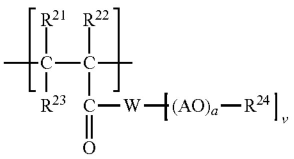

wherein $R^{21}$, $R^{22}$ and $R^{23}$ independently are H or $C_1$-$C_4$ alkyl;

W is O, $NR^{25}$, or is N;

V is 1 if W=O or $NR^{25}$, and is 2 if W=N;

A is $C_2$-$C_5$ alkylene or $CH_2CH$ $(C_6H_5)$;

a is an integer from 2 to 350;

$R^{24}$ is H or $C_1$-$C_4$ alkyl;

$R^{25}$ is H or $C_1$-$C_4$ alkyl;

(IId)

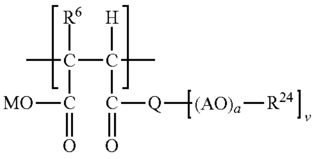

wherein $R^6$ is H or $C_1$-$C_4$ alkyl;

Q is $NR^{10}$, N or O;

V is 1 if Q=O or $NR^{10}$ and is 2 if Q=N;

$R^{10}$ is H or $C_1$-$C_4$ alkyl;

$R^{24}$ is H or $C_1$-$C_4$ alkyl;

A is $C_2$-$C_5$ alkylene or $CH_2CH$ ($C_6H_5$); and a is an integer from 2 to 350;

where each M independently is H or a cation equivalent.

7. The method according to claim 6, wherein the polymeric dispersant comprises structural units of formulae (Ia) wherein $R^1$ is H or methyl, X is a chemical bond and $R^2$ is OM;

(Id) wherein $R^6$ is H or methyl, Q is O and $R^7$ is H; and (IIa) wherein $R^{10}$ and $R^{12}$ are H, $R^{11}$ is H or methyl, n2 is 0, 1 or 2, E is $C_2$-$C_6$ alkylene, G is O, or E and G together are a chemical bond, A is $CH_2$—$CH_2$ and $R^{13}$ is H.

8. The method according to claim 1, wherein the molar mass of the polymeric dispersant is in the range of 10,000 g/mol to 80,000 g/mol.

9. The method according to claim 1, wherein the molar mass of the polyether side chains is in the range of 500 g/mol to 8,000 g/mol.

10. The method according to claim 1, wherein the polymeric dispersant is a polycondensation product which comprises the structural units (III), (IV) and (V):

(III)

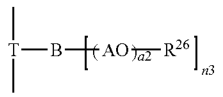

wherein

T is phenyl, naphthyl or heteroaryl having 5 to 10 ring atoms, of which 1 or 2 atoms are heteroatoms selected from N, O and S;

n3 is 1 or 2;

B is N, NH or O, with the proviso that n3 is 2 if B is N and n3 is 1 if B is NH or O;

A is $C_2$-$C_5$ alkylene or $CH_2CH$ ($C_6H_5$);

a2 is an integer from 1 to 300;

$R^{26}$ is H, $C_1$-$C_{10}$ alkyl, $C_5$-$C_8$ cycloalkyl, aryl, or heteroaryl having 5 to 10 ring atoms, of which 1 or 2 atoms are heteroatoms selected from N, O and S;

where the structural unit (IV) is selected from the structural units (Iva) and (Ivb)

(Iva)

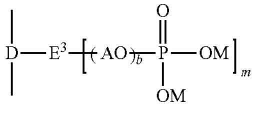

wherein

D is phenyl, naphthyl or heteroaryl having 5 to 10 ring atoms, of which 1 or 2 atoms are heteroatoms selected from N, O and S;

$E^3$ is N, NH or O, with the proviso that m is 2 if $E^3$ is N and m is 1 if $E^3$ is NH or O;

A is $C_2$-$C_5$ alkylene or $CH_2CH$ ($C_6H_5$);

b is an integer from 0 to 300;

M independently is H or a cation equivalent;

(Ivb)

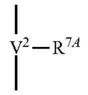

wherein $V^2$ is phenyl or naphthyl and is optionally substituted by 1 or two radicals selected from $R^8$, OH, $OR^8$, (CO) $R^8$, COOM, $COOR^8$, $SO_3R^8$ and $NO_2$;

$R^{7A}$ is COOM, $OCH_2COOM$, $SO_3M$ or $OPO_3M_2$;

M is H or a cation equivalent; and $R^8$ is $C_1$-$C_4$ alkyl, phenyl, naphthyl, phenyl-$C_1$-$C_4$ alkyl or $C_1$-$C_4$ alkylphenyl (V)

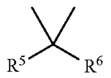

wherein $R^5$ is H, $CH_3$, COOH or substituted or unsubstituted phenyl or naphthyl;

$R^6$ is H, $CH_3$, COOH or substituted or unsubstituted phenyl or naphthyl.

11. The method according to claim 1, wherein the binder system comprises a carbonate rock powder selected from calcium carbonate-containing carbonate rock powder, limestone powder, and mixtures thereof.

12. The method according to claim 3, wherein the polyvalent metal cation is selected from $Fe^{3+}$, $Fe^{2+}$, $Ca^{2+}$, and mixtures thereof.

13. The method according to claim 5, wherein the charge density o of the polymeric dispersant is in the range of $0.7 \times 10^{-3}$ to 2.0 meq/g of solid content.

14. The method according to claim 6, wherein in general formula (IIa)

$R^{10}$, $R^{11}$ and $R^{12}$ independently of one another are H or methyl;

A is $C_2$-$C_3$ alkylene; and a is an integer from 10 to 150.

15. The method according to claim 6, wherein in general formula (IIa)

$R^{10}$, $R^{11}$ and $R^{12}$ independently of one another are H or methyl;

A is $C_2$-$C_3$ alkylene; and a is an integer from 20 to 100.

16. The method according to claim 6, wherein in general formula (IIb) $R^{16}$, $R^{17}$ and $R^{18}$ independently of one another are H;

A is $C_2$-$C_3$ alkylene;

L is $C_2$-$C_3$ alkylene;

a is an integer from 10 to 150; and d is an integer from 10 to 150.

17. The method according to claim 6, wherein in general formula (IIb)

$R^{16}$, $R^{17}$ and $R^{18}$ independently of one another are H;

A is $C_2$-$C_3$ alkylene;

L is $C_2$-$C_3$ alkylene;

a is an integer from 20 to 100; AND d is an integer from 20 to 100.

18. The method according to claim 6, wherein in general formula (IIc)

$R^{21}$, $R^{22}$ and $R^{23}$ independently are H;

A is $C_2$-$C_3$ alkylene; and a is an integer from 10 to 150.

19. The method according to claim 6, wherein in general formula (Iic)

$R^{21}$, $R^{22}$ and $R^{23}$ independently are H;

A is $C_2$-$C_3$ alkylene; and a is an integer from 20 to 100.

20. The method according to claim 6, wherein in general formula (Iid)

$R^6$ is H;

A is $C_2$-$C_3$ alkylene; and a is an integer from 10 to 150.

21. The method according to claim 6, wherein in general formula (Iid)

$R^6$ is H;

A is $C_2$-$C_3$ alkylene; and a is an integer from 20 to 100.

22. A construction composition comprising a colloidal polymer inorganic hybrid material as defined in claim 1 and a binder system, wherein the binder system comprises a cementitious binder and at least one supplementary cementitious material, wherein the supplementary cementitious material comprise a calcined clay material, comprising at least 10 wt.-% of calcined clay obtained from a non-kaolinitic clay.

23. The construction composition according to claim 22, wherein the binder system additionally comprises a carbonate rock powder.

24. The construction composition according to claim 22, wherein the calcined clay material has a BET value, as measured in accordance with DIN ISO 9277, in the range from 0.1 to 60 $m^2/g$.

25. The construction composition according to claim 22, wherein the binder system has a BET value, as measured in accordance with DIN ISO 9277, in the range from 0.1 to 40 $m^2/g$.

26. The construction composition according to claim 24, wherein the calcined clay material has a BET value, as measured in accordance with DIN ISO 9277, in the range from 1 to 40 $m^2/g$.

27. The construction composition according to claim 25, wherein the binder system has a BET value, as measured in accordance with DIN ISO 9277, in the range from 1 to 30 $m^2/g$.

* * * * *